US012592948B2

(12) United States Patent
Xu et al.

(10) Patent No.: US 12,592,948 B2
(45) Date of Patent: Mar. 31, 2026

(54) CROSS PROTOCOL MALWARE TRAFFIC DETECTION USING A TWO-LAYER ML ARCHITECTURE

(71) Applicant: Palo Alto Networks, Inc., Santa Clara, CA (US)

(72) Inventors: Lei Xu, Santa Clara, CA (US); Taojie Wang, San Jose, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 207 days.

(21) Appl. No.: 18/394,403

(22) Filed: Dec. 22, 2023

(65) Prior Publication Data

US 2025/0211602 A1      Jun. 26, 2025

(51) Int. Cl.
| | |
|---|---|
| *H04L 9/40* | (2022.01) |
| *G06F 21/55* | (2013.01) |
| *G06N 20/20* | (2019.01) |
| *H04L 41/0631* | (2022.01) |
| *H04L 41/16* | (2022.01) |

(52) U.S. Cl.
CPC ........ *H04L 63/1425* (2013.01); *G06F 21/552* (2013.01); *G06N 20/20* (2019.01); *H04L 41/0631* (2013.01); *H04L 41/16* (2013.01); *H04L 63/0428* (2013.01); *H04L 63/1433* (2013.01)

(58) Field of Classification Search
CPC . H04L 63/1425; H04L 63/10; H04L 63/1416; H04L 63/0428; H04L 12/4641; H04L 61/4511; H04L 12/4633; H04L 63/0281; H04L 67/56; H04L 63/30; H04L 63/0272; H04L 63/029; H04L 67/564; H04L 45/74; H04L 63/164; H04L 69/22; H04L 41/0631; H04L 63/1458; H04L 41/12; H04L 41/16; H04L 63/1433; H04L 41/145; H04L 43/022; H04L 63/1408; H04L 63/1441; H04L 69/18; G06N 20/00; G06N 20/20; G06N 7/01; G06N 5/02; G06N 5/01; G06N 5/025; G06F 9/545; G06F 21/552
See application file for complete search history.

(56) References Cited

U.S. PATENT DOCUMENTS

| | | | |
|---|---|---|---|
| 10,419,449 B1 | 9/2019 | Agranonik |
| 10,764,313 B1 | 9/2020 | Mushtaq |

(Continued)

FOREIGN PATENT DOCUMENTS

| | | | | |
|---|---|---|---|---|
| CN | 117118687 | 11/2023 | | |
| WO | WO-2022146802 A1 | * | 7/2022 | ......... H04L 63/1425 |

*Primary Examiner* — Kyung H Shin
(74) *Attorney, Agent, or Firm* — Van Pelt, Yi & James LLP

(57) ABSTRACT

A system, method, and device for classifying traffic is disclosed. The method includes (i) correlating a plurality of network traffic sessions with same source indicators to obtain correlated network traffic, (ii) classifying the plurality of network traffic sessions based at least in part on a plurality of first-layer classifiers to obtain a set of first-layer classifications, wherein the plurality of first-layer classifiers are respectively associated with a plurality of protocols, and (iii) determining a second-layer classification for the correlated network traffic based at least in part on the set of first-layer classifications.

25 Claims, 11 Drawing Sheets

(56)         References Cited

U.S. PATENT DOCUMENTS

2007/0289013 A1 * 12/2007 Lim ...................... G06F 21/552
                                                    726/22
2017/0310691 A1 * 10/2017 Vasseur ............... H04L 41/0631
2019/0173848 A1 *  6/2019 Lapidous ............ H04L 63/0428
2020/0219005 A1 *  7/2020 Valdez .................. G06N 20/20

* cited by examiner

200

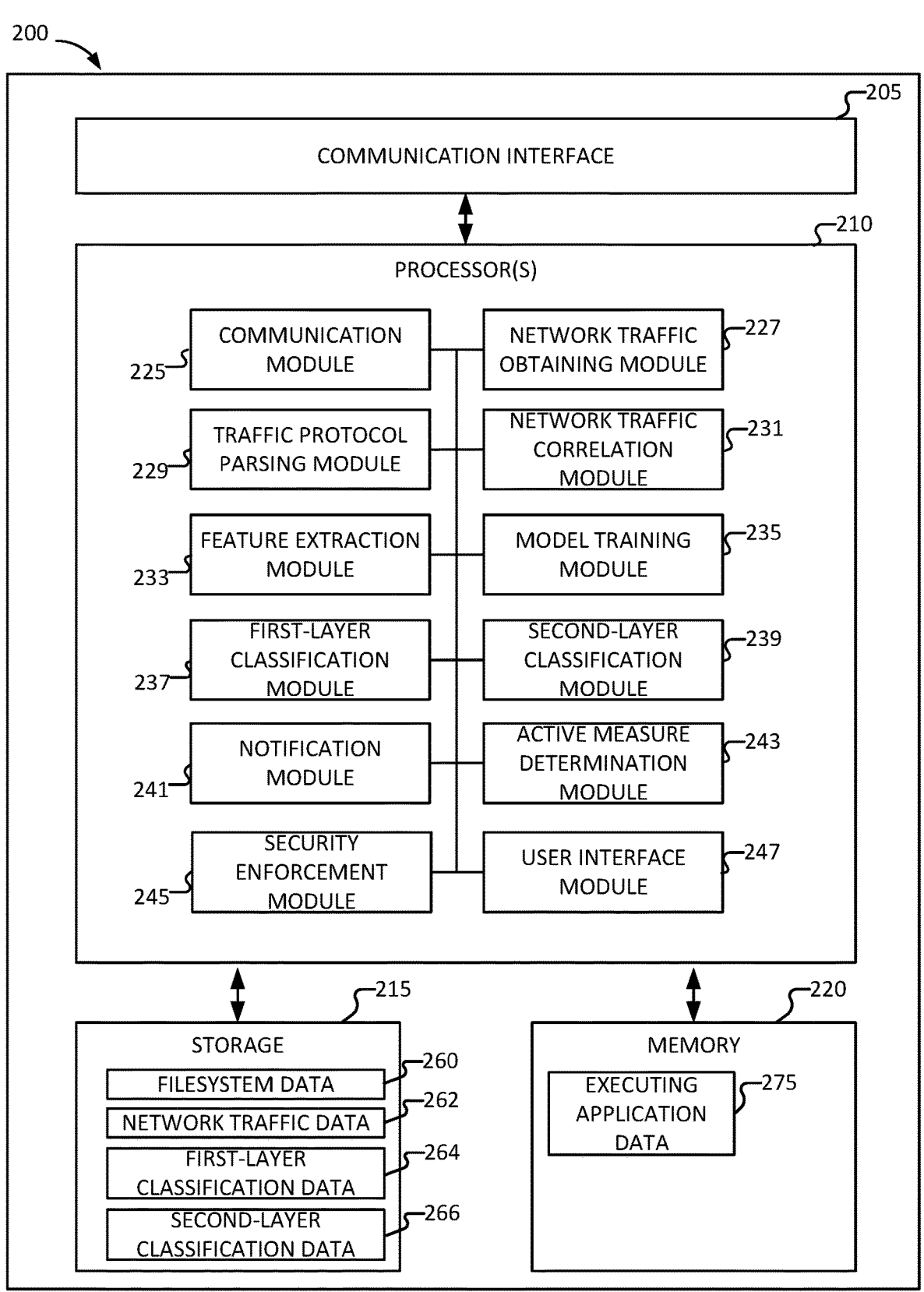

205

COMMUNICATION INTERFACE

210

PROCESSOR(S)

225 — COMMUNICATION MODULE

227 — NETWORK TRAFFIC OBTAINING MODULE

229 — TRAFFIC PROTOCOL PARSING MODULE

231 — NETWORK TRAFFIC CORRELATION MODULE

233 — FEATURE EXTRACTION MODULE

235 — MODEL TRAINING MODULE

237 — FIRST-LAYER CLASSIFICATION MODULE

239 — SECOND-LAYER CLASSIFICATION MODULE

241 — NOTIFICATION MODULE

243 — ACTIVE MEASURE DETERMINATION MODULE

245 — SECURITY ENFORCEMENT MODULE

247 — USER INTERFACE MODULE

215

STORAGE

260 — FILESYSTEM DATA

262 — NETWORK TRAFFIC DATA

264 — FIRST-LAYER CLASSIFICATION DATA

266 — SECOND-LAYER CLASSIFICATION DATA

220

MEMORY

275 — EXECUTING APPLICATION DATA

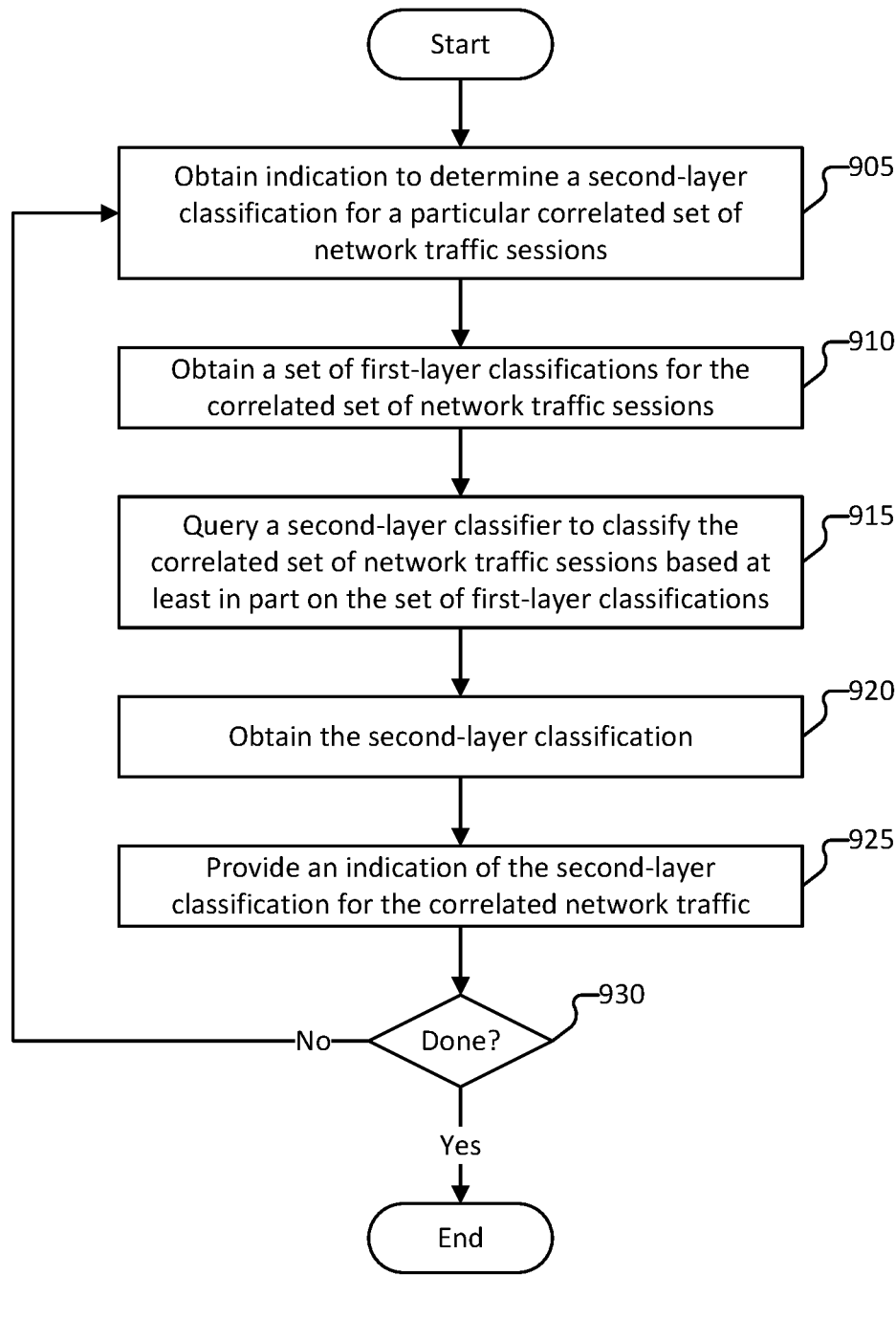

Start

Obtain indication to determine a second-layer classification for a particular correlated set of network traffic sessions — 905

Obtain a set of first-layer classifications for the correlated set of network traffic sessions — 910

Query a second-layer classifier to classify the correlated set of network traffic sessions based at least in part on the set of first-layer classifications — 915

Obtain the second-layer classification — 920

Provide an indication of the second-layer classification for the correlated network traffic — 925

Done? — 930

No

Yes

End

CROSS PROTOCOL MALWARE TRAFFIC DETECTION USING A TWO-LAYER ML ARCHITECTURE

BACKGROUND OF THE INVENTION

In today's digital landscape, the prevalence of cyber threats poses a significant challenge to organizations, governments, and individuals alike. Cybercriminals constantly evolve their tactics, making it imperative for security professionals to stay ahead by developing innovative solutions to detect and counteract malicious activities.

One common method employed by attackers is the establishment of a Command and Control (C2) infrastructure. C2 traffic enables hackers to maintain control over compromised devices, allowing them to issue commands, extract data, or launch further attacks. Traditional security measures often struggle to identify C2 traffic due to its covert nature, complex encryption, or obfuscation techniques employed by attackers.

Existing approaches to C2 traffic detection predominantly rely on signature-based or rule-based systems, which can be limited in their effectiveness. Signature-based detection relies on pre-defined patterns or known indicators of compromise (IOCs), making it susceptible to false negatives if attackers modify their techniques. Rule-based systems operate similarly, employing predefined rules to identify specific types of C2 traffic. However, rule-based approaches may struggle to keep up with the rapidly evolving threat landscape, resulting in false positives or missed detections.

Therefore, a need exists for an innovative system and method that can accurately and efficiently detect malicious C2 traffic, regardless of its obfuscation techniques or modifications made by attackers.

BRIEF DESCRIPTION OF THE DRAWINGS

Various embodiments of the invention are disclosed in the following detailed description and the accompanying drawings.

FIG. 2 is a block diagram of a system to detect a malicious sample according to various embodiments.

FIG. 9 is a flow diagram of a method for determining a classification for correlated network traffic sessions according to various embodiments.

DETAILED DESCRIPTION

Figure 1:
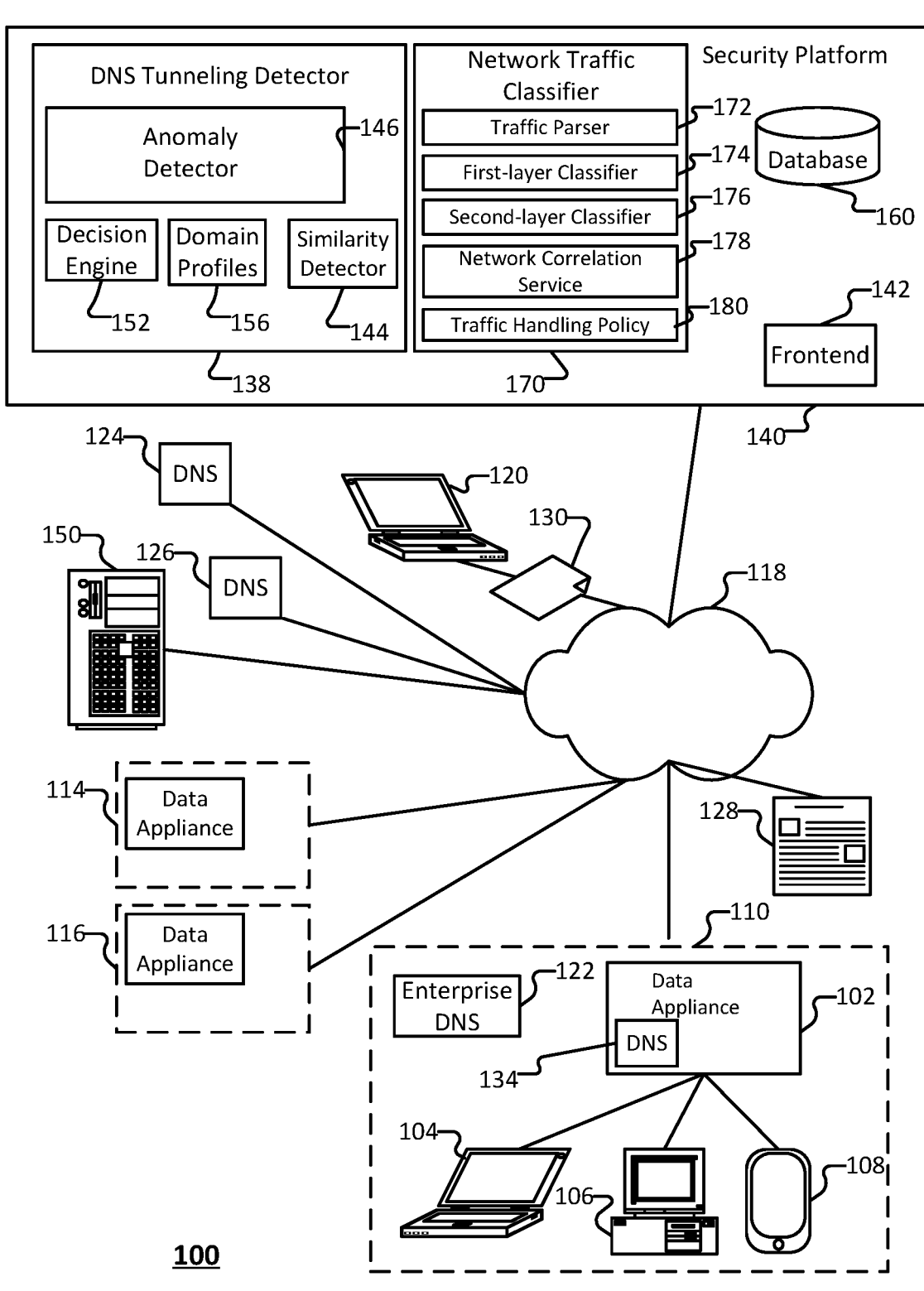
FIG. 1 is a block diagram of an environment for detecting malicious samples according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art systems may detect malware network activities using machine learning (ML) solutions are proposed to overcome the limitations of traditional signature based approaches like general to cover more malware traffic behaviors in a more automated and flexible manner. However, more and more sophisticated attacks are delivering malicious traffic in different stages, such as, malware downloading, command & control, data exfiltration, which scattered in different protocols, SSL/TLS, HTTP, DNS, which brings challenges for existing rule/ML-based solutions: 1) single session and single protocol inspection is prone to a high degree of false positive and false negatives; and 2) correlation between protocols require full traffic visibility.

Various embodiments include a classification architecture comprising a plurality of layers. For example, in some embodiments, the system comprises a two-layer machine learning (ML) architecture to detect cross-protocol malware traffic. The system correlates network traffic with same source-destination indicators (e.g., source IP addresses, destination IP addresses, etc.) and applies desiccated classifiers (e.g., ML classifiers) for each protocol as the first layer. The detection results (e.g., the set of first-layer classifications) and, optionally, a set of features from the first layer are passed to the second layer, at which the system implements a classifier (e.g., a second-level classifier) to further decide if all correlated traffic is malicious or benign/non-malicious.

In some embodiments, the system correlates the traffic based on source and destination indicators. The system can determine the correlated network traffic based at least in part on (i) determining all protocol traffic with a same source IP address for all protocols, and (ii) (a) determining all protocol traffic with same destination IP address, and/or (b) determining all protocol traffic with same domain names (e.g., host name in HTTP, domain name in DNS A record or SNI in SSL, etc.).

In some embodiments, at the first-layer classification, the system implements one or more dedicated ML/DL classifiers for each network traffic protocol. For example, the system uses an XGBoost model to classify SSL traffic, and a Long Short-Term Memory (LSTM) model or a convolutional neural network (CNN) model to classify HTTP traffic. The outputs from the first layer include the first-layer classifications from the first-layer classifiers (e.g., probabilities that the corresponding session data is malicious) and, optionally, a set of features or protocol-specific metadata (e.g., SNI for SSL, hostname for HTTP, etc.). The outputs can be used by the second-layer to determine the second-layer classification. In some embodiments, the first-layer classifiers are trained by each protocol traffic collected from benign samples and malware samples.

In some embodiments, at the second layer, the system implements one or more rule-based and/or machine learning-based classifiers to determine predictions for the correlated protocol traffic, such as an aggregated prediction across the various traffic protocols of the correlated traffic. The second-layer classifier determines the correlated network traffic classification based at least in part on one or more of the first-layer classifications and some feature and metadata information obtained or used by the first layer. In various embodiments, the second-layer classifier is trained by cross-protocol traffic collected from benign samples and malware samples.

Various embodiments provide a system, method, and device for classifying traffic. The method includes (i) correlating a plurality of network traffic sessions with same source indicators to obtain correlated network traffic, (ii) classifying the plurality of network traffic sessions based at least in part on a plurality of first-layer classifiers to obtain a set of first-layer classifications, wherein the plurality of first-layer classifiers are respectively associated with a plurality of protocols, and (iii) determining a second-layer classification for the correlated network traffic based at least in part on the set of first-layer classifications.

FIG. 1 is a block diagram of an environment for detecting malicious samples according to various embodiments. In some embodiments, system 100 is implemented at least in part by system 200 of FIG. 2 and/or system 300 of FIG. 3. System 100 may implement one or more of processes 400-1100 of FIGS. 4-11, respectively.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including (i) managing/maintaining a security policy configuration(s) for enterprise network 110 and/or devices connected to enterprise network 110 (e.g., managed devices, security entities, etc.), (ii) enforcing the security policy configuration or causing a security entity (e.g., a firewall) to enforce the security policy configuration, (iii) classifying network traffic, (iv) correlating network traffic across a plurality of traffic protocols, (v) classifying session data for a particular traffic protocol, (vi) classifying correlated network traffic (e.g., determine an aggregate classification based on classification of the session data across a plurality of different traffic protocols), (vii) training a machine learning (ML) model to generate predictions with respect to session data for a particular traffic protocol, (viii) training a machine learning (ML) model to generate predictions with respect to correlated network traffic, (iv) determining one or more predefined rules for classifying session data for a particular protocol, (x) determining one or more predefined rules for classifying session data for a particular protocol, and/or (viii) performing an active measure with respect to network traffic or files communicated across the network based on an instruction from another service or system or based on security platform 140 using a classifier (e.g., an ML model, a rule-based model, etc.) to generate a prediction with respect to the network traffic (e.g., a prediction of whether the network traffic, or session data for a particular traffic protocol, is malicious).

Security platform 140 may implement other services, such as determining an attribution of network traffic to a particular DNS tunneling campaign or tool, indexing features or other DNS-activity information with respect to particular campaigns or tools (or as unknown), classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), determining and/or providing an indication or a likelihood that correlated network traffic is malicious, determining and/or providing an indication or a likelihood that network traffic for a particular traffic protocol (e.g., HTTP session data) is malicious, determining a model score, providing/updating a whitelist of input strings, files, domains, source addresses, destination address, or other characteristics of network traffic deemed to be benign, providing/updating input strings, files, domains, source addresses, destination address, or other characteristics of network traffic deemed to be malicious, identifying malicious input strings, detecting malicious input strings, detecting malicious files, predicting whether input strings, files, or domains are malicious, and providing an indication that an input string, file, or domain is malicious (or benign).

In some embodiments, network traffic classifier 170 classifies network traffic, such as to determine whether the traffic is malicious or benign, or to determine a likelihood that the traffic is malicious or benign. Network traffic classifier 170 can store one or more classifiers (e.g., rule-based models, machine learning models, etc.). For example, network traffic classifier 170 implements one or more first-layer classifiers that are respectively configured to classify session data for a particular traffic protocol (e.g., HTTP, UDP, SSL, DNS, etc.). Network traffic classifier 170 can further store/implement one or more security policies, such as a traffic-handling policy, according to which network traffic classifier 170 causes the network traffic (e.g., the correlated network traffic) to be handled.

In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 maintains/manages one or more security policy configurations, such as firewall rules or traffic handling policies. In the example shown, network traffic classifier 170 comprises traffic parser 172, first-layer classifier 174, second-layer classifier 176, network correlation service 178, and/or traffic handling policy 180. Network traffic classifier 170 can receive network data, such as session data for various traffic protocols. In some embodiments, network traffic classifier 170 receives the network data in connection with processing a request from a client system or other security entity (e.g., a firewall) for a network traffic classification. In response to receiving the network traffic and/or the request to perform a network traffic classification, network traffic classifier 170 parses the network traffic (e.g., to obtain information pertaining to the various session data, such as source-destination information, etc.), obtains a first-layer classification for the session data for the various traffic protocols, correlates network traffic (e.g., according to source-destination information, etc.) such as to correlate network traffic across two or more different traffic protocols, obtains a second-layer classification for the correlated network traffic, and provides a classification for the correlated network traffic or causes the network traffic classification according to the classification for the correlated network traffic.

Network traffic classifier 170 can use traffic parser 172 to parse a network traffic, such as session data. Traffic parser 172 is configured to parse session data for a plurality of different traffic protocols. Traffic parser 172 can analyze the network traffic for various traffic protocols to obtain source information, destination information, and other information/metadata information for session data (e.g., information comprised in a header).

Network traffic classifier 170 can use first-layer classifier 174 to determine (e.g., generate) a classification (e.g., a first-layer classification) for session data for a particular traffic protocol. For example, first-layer classification 174 comprises a set of first-layer classifiers that determine a set of first-layer classification for session data across a plurality of traffic protocols (e.g., the session data comprised in a particular correlated network traffic). The set of first-layer classifiers may comprise a rule-based classifier/model and/or machine learning-based classifier/model.

Network traffic classifier 170 can use second-layer classifier 176 to determine a classification for correlated network traffic. Second-layer classifier 176 is configured to determine a second-layer classification, such as a prediction of whether correlated network traffic, is malicious or benign. Second-layer classifier 176 may comprise a rule-based classifier/model and/or a machine learning-based classifier/model. In some embodiments, second-layer classifier 176 determines the second-layer classification based at least in part on one or more of the set of first-layer classifications. Additionally, second-layer classifier 176 can determine the second-layer classification based at least in part on information pertaining to the session data for one or more of the plurality of traffic protocols such as source-destination information, metadata or header data for the session data, and/or features obtained by the first-layer classifier 174.

Network traffic classifier 170 can use network correlation service 178 to correlate network traffic across a plurality of traffic protocols. In some embodiments, network correlation service 178 correlates the network traffic based on source information and/or destination information, such as by matching session data having matching source-destination information. Network traffic classifier 170 uses network correlation service 178 to determine the various session data to be correlated for determining the second-layer classification.

Network traffic classifier 170 can use traffic handling policy 180 to store and/or maintain security policies. An example of the security policy is a traffic handling policy, such as firewall rules. Traffic handling policy 180 may enforce one or more security policies based at least in part on network traffic classification, such as the correlated network traffic classification (e.g., the second-layer classification). Additionally, or alternatively, traffic handling policy 180 may cause one or more security policies to be enforced by another system or device, such as a client system or a security entity (e.g., a firewall).

According to various embodiments, security platform 140 comprises DNS tunneling detector 138 and/or network traffic classifier 170. Security platform 140 may include various other services/modules, such as a malicious sample detector, a parked domain detector, an application classifier or other traffic classifier, etc. In response to receiving an indication that an assessment of a sample of network traffic (e.g., C2 type classification, determine whether the malicious/benign, etc.) is to be performed, security platform 140 analyzes the sample to determine the assessment of the network traffic (e.g., C2 traffic classification, determine whether the sample is malicious or benign/non-malicious, etc.) and/or an attribution of the network traffic (e.g., detection that the network traffic corresponds to a particular DNS tunneling campaign or tool).

In some embodiments, system 100 (e.g., a network traffic classifier 170 for security platform 140, an inline firewall or other inline security entity, etc.) determines whether information pertaining to a particular sample (e.g., a newly received sample or network traffic to be analyzed) is comprised in a dataset of historical samples (e.g., historical network traffic), whether a particular signature is associated with malicious traffic, whether the signature can be attributed to a particular DNS tunneling campaign or tool, or whether traffic corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, system 100 (e.g., security platform 140 or other inline security entity) may deem that the sample/traffic has not yet been analyzed and system 100 can invoke an analysis (e.g., a sample analysis) of the sample or a set of session data in connection with determining (e.g., predicting) the traffic classification (e.g., an inline security entity can query a classifier that uses the header information for the sample to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

FIG. 2 is a block diagram of a system to detect a malicious sample according to various embodiments. In some embodiments, system 200 is implemented at least part of system 100 of FIG. 1 and/or system 300 of FIG. 3. System 200 may implement one or more of processes 400-1100 of FIGS. 4-11, respectively. System 200 may be implemented in one or more servers, a security entity such as a firewall, an endpoint, a security service provided as a software as a service.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 performs contemporaneous/real-time detection of malicious samples such as multi-modal exploits, correlates network traffic samples, trains classifiers such as rule-based classifiers or machine learning-based classifiers, and/or handles traffic according to classifications, etc.). The service may be provided by one or more servers. For example, system 200 or network traffic classifier 170 is deployed on a remote server that monitors or receives network traffic that is transmitted within or into/out of a network and enforces security policies, classifies network traffic (e.g., as malicious, benign, etc.), sends/pushes out notifications or updates pertaining to the network traffic such as an indication of the application to which the network traffic corresponds or an indication of whether an application is malicious, or enables a user or other system to configure the security policy configuration for a network or a particular security entity (e.g., a firewall). In some embodiments, part of system 200 is implemented as a service (e.g., a cloud service provided by one or more remote servers) and another part of system 200 is implemented at a security entity or other network node such as a client device.

In some embodiments, system 200 receives network traffic samples, such as from inline security entities (e.g., firewalls) in connection with ad hoc requests to classify the network traffic. The network traffic samples may comprise samples corresponding to a plurality of traffic protocols. For example, system 200 receives the network traffic samples in connection with performing a multi-modal classification of network traffic (e.g., detection of multi-modal malicious exploits).

System 200 performs a multi-layer classification of the network traffic samples. In some embodiments, system 200 performs protocol-specific classifications (e.g., a set of first-layer classifications) for the various traffic protocols of the network traffic samples, and thereafter performs a correlated network traffic classification (e.g., a second-layer classification). System 200 performs the correlated network traffic classification based at least in part on the results from the set of first-layer classification.

System 200 stores signatures of classified network traffic samples (e.g., the protocol-specific classifications or the network traffic classifications) in association with the determined classifications. The index/mapping of signatures to classifications may be used for a quick look up to determine a classification of a sample. The index/mapping of signatures to classifications (e.g., whitelists, blacklists, etc.) can be sent to inline security entities, which can perform the lookup against the index/mapping inline or in real-time, such as before determining to send the sample(s) to system 200 for analysis.

In response to determining a classification of the network traffic sample(s), system 200 can cause the network traffic to be handled according to the classification. For example, system 200 implements, or causes inline security entities to implement, a security policy to determine the handling of network traffic according to classifications. In response to determining that the network traffic sample is classified as malicious, the corresponding network traffic is handled as malicious (e.g., quarantined, blocked, etc.). In response to determining that the network traffic sample is classified as non-malicious/benign, the corresponding network traffic is handled as non-malicious (e.g., permitted to be transmitted across the network).

In the example shown, system 200 implements one or more modules in connection with enforcing a security policy configuration (e.g., a set of firewall rules), classifying network samples, such as multi-modal exploits, etc. System 200 comprises communication interface 205, one or more processor(s) 210, storage 215, and/or memory 220. One or more processors 210 comprises one or more of communication module 225, network traffic obtaining module 227, traffic protocol parsing module 229, network traffic correlation module 231, feature extraction module 233, model training module 235, first-layer classification module 237, second-layer classification module 239, notification module 241, active measure determination module 243, security enforcement module 245, and user interface module 247.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface

205 provides to communication module 225 information received by system 200. Communication module 225 is configured to receive an indication of samples (e.g., network traffic samples, such as HTTP requests, URLs, URIs, SSL communications, etc.) to be analyzed, such as from network endpoints or nodes such as security entities (e.g., firewalls), database systems, query systems, etc. Communication module 225 is configured to query third party service(s) for information pertaining to the network traffic classifications (e.g., services that expose information/classifications for signatures/hashes of network traffic such as third-party scores or assessments of maliciousness of particular traffic, a community-based score, assessment, or reputation pertaining to domains or applications, a blacklist for domains, applications, or certain types/signatures of network traffic such as HTTP requests, and/or a whitelist for domains, applications, or other certain types of network traffic, etc.). For example, system 200 uses communication module 225 to query the third-party service(s). Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the traffic classification (e.g., for predicting whether traffic is C2 traffic, or predicting whether the traffic is malicious/non-malicious), a set of predefined signatures to be assessed or counted, information pertaining to a whitelist of domains, applications, nodes, or signatures for traffic (e.g., traffic that is not deemed suspicious or malicious), information pertaining to a blacklist of domains, applications, nodes, or signatures for traffic (e.g., traffic that is deemed to be suspicious or malicious and for which traffic is to be quarantined, deleted, or otherwise to be restricted from being executed/transmitted), configuration of classifiers such as rule-based classifiers or machine learning-based classifiers, etc.

In some embodiments, system 200 comprises network traffic obtaining module 227. System 200 uses network traffic obtaining module 227 to receive network traffic samples. In some embodiments, such as in contexts where system 200 is an inline security entity that performs detection of malicious samples in-line with the transmission of data across the network, network traffic obtaining module 227 obtains the network traffic samples as the data is transmitted across the network. In various embodiments, such as in contexts where system 200 is a cloud service that detects malicious samples upon request from an inline security entity, network traffic obtaining module 227 obtains a request to classify a network traffic sample(s). The request may comprise the network traffic sample(s) or information extracted from the network traffic sample(s) (e.g., information extracted by the system or service requesting classification from system 200). The request may be communicated to system 200 by an inline security entity, a client device, etc.

In some embodiments, the network traffic samples comprise samples for a plurality of different traffic protocols, such as HTTP, SSL/TLS, DNS, UDP, etc.

In some embodiments, system 200 comprises traffic protocol parsing module 229. System 200 uses traffic protocol parsing module 229 to parse network traffic samples. Traffic protocol parsing module 229 can parse a network traffic to extract information that characterizes the network traffic sample, such as information that can be used to predict a classification of the network traffic sample (e.g., to predict whether the sample is malicious or a likelihood that the sample is malicious). For example, the information obtained by traffic protocol parsing module 229 can be used to generate features or embeddings to be used to query a classifier for a predicted classification, or used to check against a predefined set of rules for a rule-based classifier.

In some embodiments, traffic protocol parsing module 229 parses the network traffic sample based on a determination of a particular traffic protocol (e.g., a traffic protocol type) corresponding to the network traffic sample. Traffic protocol parsing module 229 can comprise a plurality of parsers that parse traffic samples for various different traffic protocols. For example, a particular parser may be configured to parse a traffic sample of a particular traffic protocol. As another example, a particular parser may be configured to parse traffic samples across a plurality of different traffic protocols. Examples of protocols supported by (e.g., that can be parsed by) traffic protocol parsing module 229 include HTTP, SSL/TLS, DNS, UDP, TCP, ICMP, etc. Various other protocols may be supported by traffic protocol parsing module 229.

In some embodiments, system 200 comprises network traffic correlation module 231. System 200 uses network traffic correlation module 231 to correlate network traffic sessions associated with the network traffic samples. For example, network traffic correlation module 231 determines from a plurality of network traffic samples obtained by system 200 a set of network traffic samples having correlated network traffic sessions (e.g., the correlated network traffic). Network traffic correlation module 231 can correlate network traffic sessions based at least in part on a matching of network traffic samples having same source-destination indicators. Accordingly, network traffic correlation module 231 can correlate network traffic sessions between a plurality of different traffic protocols. For example, network traffic correlation module 231 can correlate a first network traffic session having an HTTP protocol with a second network traffic session having an SSL protocol.

In some embodiments, network traffic correlation module 231 determines that a plurality of network traffic sessions is correlated based at least in part on a determination that (i) the corresponding network traffic samples have a same source address (e.g., source IP address), and (ii) the corresponding network traffic samples have a same destination. Network traffic samples can be deemed to have a same destination if the samples have a same destination IP address or a same domain name. As an example, the domain name can be extracted (e.g., by traffic protocol parsing module 229) from the HTTP header, etc.

In some embodiments, system 200 comprises feature extraction module 233. System 200 uses feature extraction module 233 to determine features based at least in part on the information parsed from the network traffic samples (e.g., by traffic protocol parsing module 229). The features may be predefined based on the particular classifier that uses the features to generate the predicted classification. For example, a first set of features (e.g., HTTP features) used by a first first-layer classifier that classifies network traffic samples for an HTTP protocol may be different from a second set of features (e.g., SSL features) used by a second first-layer classifier that classifies network traffic samples for an SSL protocol. Additionally, or alternatively, feature extraction module 233 determines features used by a second-layer classifier that provides a second-layer classification, such as a prediction of whether the correlated network traffic samples (e.g., the correlated network traffic sessions) correspond to malicious traffic, or a prediction of the likelihood that the correlated network traffic samples correspond to malicious traffic.

In some embodiments, system 200 comprises model training module 235. System 200 uses model training module 235 to train one or more of the first-layer classifiers and the second-layer classifier. The classifiers can be rule-based classifiers or machine learning-based classifiers (e.g., machine learning models). As an example, one or more of the first-layer classifiers and the second-layer classifier are rule-based classifiers, and one or more of the first-layer classifiers and the second-layer classifier are rule-based classifiers are machine learning-based classifiers. As another example, at least one of the one or more of the first-layer classifiers and the second-layer classifier is a rule-based classifier and at least one of the one or more of the first-layer classifiers and the second-layer classifier is a machine learning-based classifier.

In the case of rule-based classifiers, the classifier predicts a classification for a network traffic sample based on the one or more rules (e.g., from a predefined set of rules associated with the classifier) that the network traffic sample satisfies (or does not satisfy). In some implementations, one or more rules of the set of rules are manually defined, such as by a subject matter expert. In some implementations, one or more rules of the set of rules are defined based on an artificial intelligence process.

In the case of machine learning-based classifiers, the classifier predicts a classification based on querying a machine learning model. The machine learning model can be trained via a machine learning process using a training set (e.g., a set of historical malicious network traffic samples and a set of historical benign network traffic samples). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

In some embodiments, system 200 comprises first-layer classification module 237. System 200 uses first-layer classification module 237 to classify a network traffic sample (e.g., to predict whether a network traffic session is malicious or benign, etc.). First-layer classification module 237 implements a plurality of first-layer classifiers, such as to classify a plurality of different traffic protocol types.

In some embodiments, the first-layer classifier(s) is trained to generate a prediction whether a particular network traffic sample is malicious, or a prediction of a likelihood or probability that the particular network traffic sample is malicious. The first-layer classifier(s) may be protocol-specific (e.g., a first first-layer classifier can classify network samples having an HTTP protocol, a second first-layer classifier can classify network samples having an SSL protocol, a third first-layer classifier can classify network samples having a UDP protocol, etc.). For example, first-layer classification module 237 may comprise a plurality of first-layer classifiers that respectively classify network samples of a plurality of different traffic protocols.

The first-layer classification generated by a first-layer classifier may be an indication of whether the network traffic sample being classified is malicious or benign. Alternatively, or additionally, the first-layer classification may be an indication of a probability or a likelihood that the network traffic sample being classified is malicious (e.g., the first-layer classification may be a number between 0 and 1). Various other scoring of maliciousness may be implemented.

In some implementations, each first-layer classification classifies a network sample according to a particular traffic protocol. However, some exploits use a plurality of different traffic protocols to accomplish their goal. If the first-layer classification only classifies according to a particular traffic protocol and the network session using that particular protocol is not classified as malicious, the use of the network session in conjunction with other network sessions of different traffic protocols may be malicious. Accordingly, in some embodiments, system 200 classifies the correlated network sessions (e.g., a set of correlated network traffic samples) in connection with determining whether the collective set of correlated network traffic samples corresponds to a malicious exploit.

In some embodiments, system 200 comprises second-layer classification module 239. System 200 uses second-layer classification module 239 to classify the correlated network sessions. Second-layer classification module 239 may implement a second-layer classifier, which may be a rule-based classifier or a machine learning-based classifier (e.g., a ML model). Second-layer classification module 239 thus provides cross-protocol malware traffic detection. In some embodiments, the second-layer classifier is a CNN model based classifier. In some embodiments, the second layer classifier is a voting-based classifier. Various other types of classifiers may be implemented.

In some embodiments, second-layer classification module 239 determines the second-layer classification based at least in part on a set of first-layer classifications (e.g., classifications for each protocol used by the correlated network traffic sessions).

Second-layer classification module 239 may implement a rule-based classifier to generate the second-layer classification (e.g., the verdict of whether the correlated traffic is malicious or benign). As an example of a rule-based classifier, the second-layer classifier deems the correlated network traffic sessions as malicious (e.g., malware is detected) in the event that at least one first-layer classification of the set of first-layer classifications for the correlated network sessions is indicative of being malicious. As another example of a rule-based classifier, the second-layer classifier deems the correlated network traffic sessions as malicious (e.g., malware is detected) in the event that a majority of the first-layer classifications in the set of first-layer classifications for the correlated network traffic (e.g., correlated network sessions/samples). As another example of a rule-based classifier, the second-layer classifier deems the correlated network traffic sessions as malicious (e.g., malware is detected) in the event that a number of first-layer classifications of the first-set of classifications for the correlated network traffic that are indicative of the respective samples as being malicious exceeds a predefined maliciousness threshold. As another example of a rule-based classifier, the second-layer classifier deems the correlated network traffic sessions as malicious (e.g., malware is detected) in the event that a statistical representation (e.g., mean, average, etc.) of the classifications in the set of first-layer classifications exceeds a predefined threshold value (e.g., if the average of first-layer classifications is greater than 0.5 or another predefined threshold value). Various other rules or heuristics may be implemented to classify the correlated network traffic based at least in part on the set of first-layer classifications.

Second-layer classification module 239 may implement a machine learning-based classifier to generate the second-layer classification (e.g., the verdict of whether the correlated traffic is malicious or benign). The second-layer classifier may be trained based on a training set comprising a set of historical malicious samples (e.g., samples of correlated network sessions that are deemed malicious) and a set of historical benign samples (e.g., samples of correlated network sessions that are deemed benign). In some embodiments, the second-layer classifier uses the set of first-layer classifications to generate the second-layer classification. For example, second-layer classification module 239 queries the second-layer classifier based on the set of first-layer classifications. In some embodiments, the second-layer classifier generates the second-layer classification based on using the set of first-layer classifications and other data pertaining to one or more of the network traffic samples for the correlated network traffic. For example, second-layer classification module 239 queries the second-layer classifier based on one or more first-layer classifications and one or more features determined for the first-layer classifiers (e.g., the features used by one or more first-layer classifiers), such as HTTP features, SSL features, DNS features, and/or UDP features.

In some embodiments, system 200 comprises notification module 241. System 200 uses notification module 241 to provide an indication of the traffic classification, such as an indication whether the traffic (e.g., the correlated network traffic) is malicious, an indication whether the traffic is C2 traffic, an indication of the particular C2 framework to which the traffic corresponds, if any, etc. Notification module 241 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 241 may also provide an indication of an active measure to be implemented (e.g., the active measure determined by active measure determination module 243) or a recommendation for an active measure to be implemented (e.g., a recommendation for handling the traffic based on the traffic classification, etc.).

System 200 may use notification module 241 to provide to one or more security entities (e.g., a firewall), nodes, or endpoints (e.g., a client terminal) an update to a whitelist of traffic, such as a whitelist of IP addresses (e.g., IP addresses from which HTTP requests originate) or a whitelist of traffic signatures (e.g., hashes for samples deemed to be benign). According to various embodiments, notification module 241 obtains a hash, signature, or other unique identifier associated with the domain (e.g., a webpage for the domain) or network traffic, and provides the indication of whether the sample is malicious in connection with the hash, signature, or other unique identifier associated with the sample. Additionally, or alternatively, notification module 241 provides to one or more security entities, nodes, or endpoints, an update to a blacklist of traffic, such as a blacklist of IP addresses or a blacklist of traffic signatures for traffic deemed to be (e.g., previously classified as) malicious.

According to various embodiments, the hash of a sample corresponds to a hash of an IP address (e.g., the IP address from which the HTTP request originates), a hash of header information, a hash of header information that is formatted according to a predefined format, etc. A security entity or an endpoint may compute a hash of a sample or traffic monitored/analyzed. The security entity or an endpoint may determine whether the computed hash corresponding to the sample is comprised within a set such as a whitelist of benign traffic, and/or a blacklist of traffic, etc. If a signature for a received sample is included in the set of signatures for samples previously deemed malicious (e.g., a blacklist of samples), the security entity or an endpoint can prevent the transmission of the corresponding traffic or prevent traffic to/from a client device from which C2 traffic was collected.

In some embodiments, system 200 comprises active measure determination module 243. System 200 uses active measure determination module 243 to determine an active measure to recommend or implement the active measure based on the evaluation result (e.g., the classification, such as the classification of the correlated network traffic obtained from the second-layer classifier). System 200 may store, or have access to, a mapping of contexts to active measures. The contexts may correspond to classifications, such as a classification of a type of traffic, a classification that the traffic is malicious, a classification that the traffic is benign or non-malicious, an indication that the classification is indeterminate (e.g., the sample requires further/manual analysis or evaluation), etc. In response to system 200 determining a classification, active measure determination module 243 may query the mapping of contexts to active measures to determine the active measure to be implemented. Examples of active measures may include generating an alert/notification of an evaluation result (e.g., informing a system administrator that malicious traffic is detected), quarantining or blocking transmission of network traffic classified as malicious, etc. Various other active measures may be implemented/recommended.

In some embodiments, active measure determination module 243 implements the active measure. As an example, active measure determination module 243 causes the active measure to be implemented, such as by system 200 (e.g., another module in system 200) or another system/service.

In some embodiments, system 200 comprises security enforcement module 245. System 200 uses security enforcement module 245 to enforce one or more security policies with respect to information such as network traffic, files, etc. Security enforcement module 245 enforces the one or more security policies based on whether the file is determined to be malicious. For example, system 200 uses security enforcement module 245 to perform an active measure, or cause an inline security entity to perform the active measure (e.g., in the case that system 200 is a cloud service), with respect to the network traffic in response to detecting the that the traffic corresponds to malicious traffic (e.g., C2 traffic). As an example, in the case of system 200 being a security entity (e.g., a firewall) or firewall, system 200 comprises security enforcement module 239. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

In some embodiments, system 200 comprises user interface module 247. System 200 uses user interface module 247 to configure and provide a user interface to a user, such as to a client system used by an administrator. User interface module 241 configures a user interface to provide the notifications or alerts, such as prompting the user that malicious traffic is detected or has been handled, prompting the user to select an active measure to be performed with respect to particular traffic, etc. Additionally, user interface module 241 may include various input fields or selectable elements with which a user can provide user feedback. In some embodiments, user interface module 241 provides an interface via which a user may select among a plurality of active measures to be implemented, and in response to receiving a user selection, system 200 causes the active measure to be implemented.

In some embodiments, system 200 uses user interface module 247 to configure a user interface via which a user/administrator can configure the system, such as to define or update security policies, first-layer classifiers, second-layer classifiers, machine learning processes to be used to train the classifiers, rules for a rule-based classifier, etc.

According to various embodiments, storage 215 comprises one or more of filesystem data 260, network traffic data 262, first-layer classification data 264, and second-layer classification data 266. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic profiles deemed to be suspicious or malicious, etc.

In some embodiments, network traffic data 262 comprises network traffic samples, such as samples collected from monitoring a network or from inline security entities that communicate the samples to system 200 for analysis. Network traffic data 262 comprises the plurality of network traffic samples and the correlated network traffic. Network traffic data 262 may also include historical data, such as historical malicious samples and historical benign samples. The historical data can be used as a training set for training the second-layer classifier and/or one or more of the first-layer classifiers. For example, the training set can be used to train such a classifier(s) using a machine learning process.

In some embodiments, first-layer classification data 264 comprises data generated in connection with classifying the network traffic samples with the first-layer classifiers. For example, first-layer classification data 264 comprises features or embeddings generated to query the first-layer classifiers. Additionally, first-layer classification data 264 comprises a verdict or classification (e.g., an indication that a protocol-specific network traffic sample is malicious or benign, an indication of a probability or likelihood that the protocol-specific network traffic sample is malicious, etc.). First-layer classification data 265 may also include other information pertaining to the network traffic samples, such as header information, an indication of a traffic protocol for a particular network traffic sample, etc. In some embodiments, first-layer classification data 264 stores the one or more first-layer classifiers, such as a rule-based classifier (e.g., a classifier that generates a predicted classification based on a set of rules) or a machine learning model that predicts a first-layer classification for correlated network traffic. In some embodiments, each of the first-layer classifiers are specific to a particular traffic protocol (e.g., the classifier predicts a classification for samples having the particular traffic protocol). The set of first-layer classifiers can collectively provide predictions across a plurality of traffic protocols.

In some embodiments, second-layer classification data 266 comprises data generated in connection with classifying the network traffic samples with the second-layer classifier. For example, second-layer classification data 266 comprises features or embeddings generated to query the second-layer classifier. Additionally, second-layer classification data 266 comprises a verdict or classification (e.g., an indication that the correlated network traffic is malicious or benign, an indication of a probability or likelihood that the correlated network traffic is malicious, etc.). In some embodiments, second-layer classification data 266 stores the second-layer classifier, such as a rule-based classifier (e.g., a classifier that generates a predicted classification based on a set of rules) or a machine learning model that predicts the second-layer classification for correlated network traffic.

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
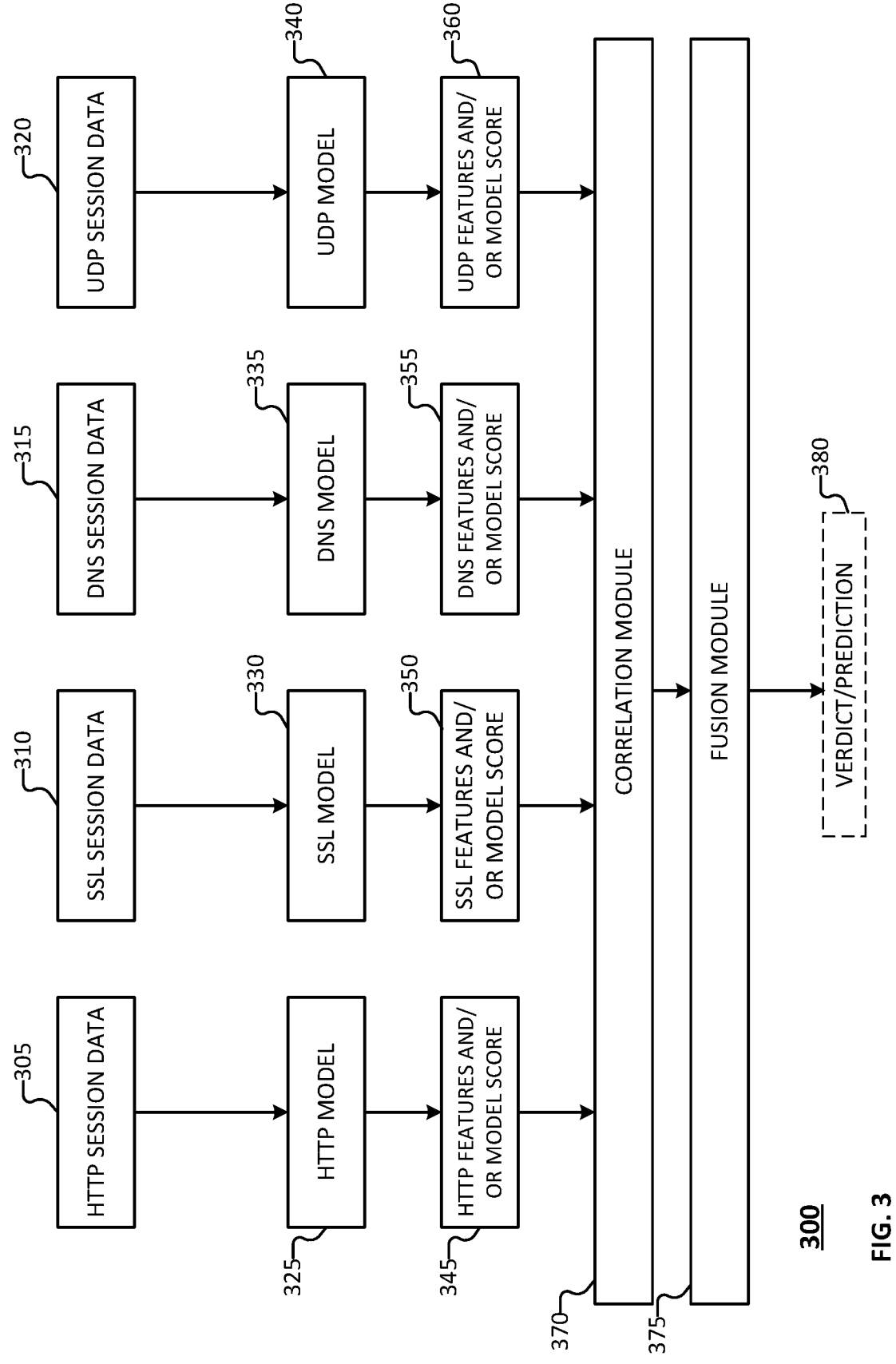
FIG. 3 is an illustration of a system for detecting a malicious sample according to various embodiments.

FIG. 3 is an illustration of a system for detecting a malicious sample according to various embodiments. In some embodiments, system 300 is implements at least part of system 100 of FIG. 1. System 300 may be implemented at least in part by system 200 of FIG. 2. System 300 may implement one or more of processes 400-1100 of FIGS. 4-11, respectively. System 300 may be implemented in one or more servers, a security entity such as a firewall, an endpoint, a security service provided as a software as a service.

System 300 receives various network traffic samples for a set of network traffic sessions. The network traffic samples may include samples for a plurality of different traffic protocols. In the example shown, system 300 receives one or more of HTTP session data 305 (e.g., a network traffic sample according to the HTTP protocol), SSL session data 310, DNS session data 315, and/or UDP session data 320.

System 300 provides the network traffic samples to corresponding first-layer classifiers for performing classifications (e.g., protocol-specific classifications). A set of first-layer classifiers include HTTP model 325, SSL model 330, DNS model 335, and/or UDP model 340. For example, HTTP session data 305 is provided to HTTP model 325, which generates a classification for a network traffic session communicated using the HTTP protocol. Similarly, system 300 provides SSL session data 310 to SSL model 330; DNS session data 315 to DNS model 335; and UDP session data 320 to UDP model 340.

The first-layer classifiers generate first-layer classifications. Additionally, the first-layer classifiers determine a set of features, such as features used in determining the first-layer classifications (e.g., used for querying the machine learning model). System 300 obtains the first-layer classifications and/or the features for the particular traffic protocol and determines a second-layer classification (e.g., by a second-layer classifier such as fusion module 375).

System 300 determines correlated network traffic, such as in order to be able to classify second-layer classifications based on related first-layer classifications. System 300 may use correlation module 370 to determine the correlated network traffic. In some embodiments, correlation module 370 determines correlated network traffic (e.g., identifies the various network traffic sessions that are related or that correspond to a particular exploit being perpetrated) based at least in part on determining the of network traffic sessions having the same source-destination indicators. For example, the system correlates the first-layer classifications for the network traffic sessions that are identified as having the same source-destination indicators. The system may further correlate the first-layer classifications or corresponding network traffic sessions based at least in part on a time associated with the particular session data (e.g., a timestamp), such as correlating sessions within a threshold time.

Although the example shown illustrates correlation module 370 disposed downstream form the first-layer classifications, correlation module 370 can be disposed upstream with respect to the first-layer classification. For example, the system can correlate the network traffic sessions before inputting the various network traffic data (e.g., the network traffic session data, such as HTTP session data, SSL session data, etc.). The system can determine the correlated network traffic and then input the session data (e.g., of different types of protocols) with the correlated network traffic to corresponding first-layer classifiers. The first-layer classifiers in turn generate a set of first-layer classifications that can be input to the second classifier (e.g., fusion module 375). The second-layer classifier can determine a verdict for the correlated network traffic taking into consideration a plurality of the first-layer classifications and thus creating a multimodal classification and enabling detection of exploits that use a plurality of different types of protocols to collectively perpetrate the exploit.

In the example shown, correlation module 370 collects first-layer classifications for which the network traffic is correlated, correlates the network traffic, and inputs the correlated traffic to the second classifier (e.g., fusion module 375). For example, system 300 provides model scores (e.g., the HTTP model score, the SSL model, the DNS model scores, the UDP model score) for the first-classifications that were performed with respect to related traffic. In the case that the exploit uses only the HTTP, SSL, and DNS protocols in connection with carrying out the exploit, correlation module 370 correlates those first-layer classifications for the protocols used. As illustrated, the features computed by the first-layer classifiers may also be provided to correlation module 370, which correlates the various features and model scores for protocols associated with the various related session data (e.g., the session data used to carry out the exploit).

In some embodiments, system 300 comprises fusion module 375 (e.g., a second-layer classifier) that determines a second-layer classification based at least in part on a set of first-layer classifications obtained by a set of first-layer classifications (e.g., a plurality of first-layer classifications). Fusion module 375 determines the second-layer classification based on a combination of one or more first-layer classifications and/or one or more of the features generated by the first layer classifications.

In some embodiments, fusion module 375 determines the second-layer classification based at least in part on querying a second-layer classifier, such as a machine learning model. The machine learning model may be trained to use information from one or more first-layer classifications and/or one or more of the features generated by the first layer classifications.

In some embodiments, fusion module 375 determines the second-layer classification based at least in part on querying a second-layer classifier, such as a rule-based classifier. The second-layer classifier may determine/predict the second-layer classification based at least in part on one or more predefined rules. The predefined rules may be defined by subject matter experts or various AI or machine learning processes. In some implementations, the predefined rules include one or more heuristics that are indicative of correlated network traffic being malicious.

An example of a rule may be to deem the correlated network traffic as malicious if a threshold number of first-layer classifications for the correlated network traffic (e.g., the session data across a plurality of protocols) is indicative that the corresponding session data input to the first-layer classifiers is malicious.

An example of another rule may be to deem the correlated network traffic as malicious in response to determining that an average model score (or a weighted average model score according to a set of predefined weightings) with respect to model scores obtained by the first-layer classifiers is greater than a threshold model score number. In the case that the model score is indicative of a probability that the corresponding traffic is malicious, then an example of a threshold model score number may be 0.5. In computing the average or weighted average model score, the system may disregard model scores deemed to be outliers.

An example of another rule may be to deem the correlated network traffic as malicious based on one or more of the first-layer classifications. For example, IF the first layer classification for an SSL protocol (e.g., an SSL model probability) is greater than or equal to 0.6 AND the first layer classification for an HTTP protocol (e.g., the HTTP model probability) is greater than or equal to 0.6, AND ((SNI from the SSL traffic is DGA generated) OR (the hostname from the HTTP traffic is DGA generated)), THEN the session group is predicted (e.g., deemed) to be malicious.

Various other predefined rules may be implemented.

System 300 obtains a verdict/prediction 380 from fusion module 375. An indication of the verdict/prediction 380 may be provided to the system, service, or process that invoked system 300 to classify the network traffic. In some embodiments, verdict/prediction 380 indicates whether the correlated network traffic is malicious or benign. Additionally, or alternatively, verdict/prediction 380 indicates the likelihood or probability that the correlated network traffic is malicious.

Figure 4:
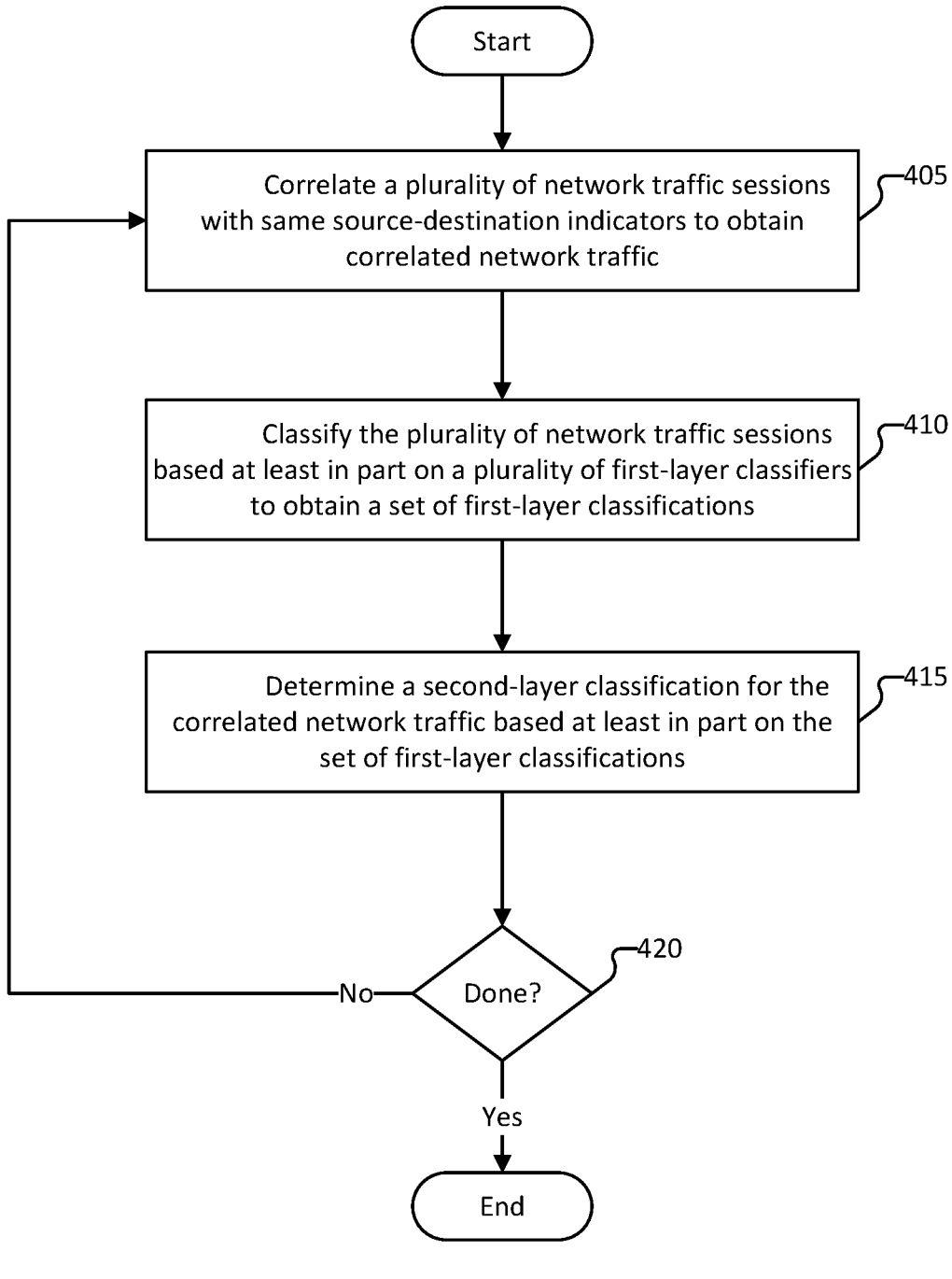
FIG. 4 is a flow diagram of a method for classifying network traffic sessions according to various embodiments.

FIG. 4 is a flow diagram of a method for classifying network traffic sessions according to various embodiments. In various embodiments, process 400 is implemented at least in part by system 100 of FIG. 1, system 200 of FIG. 2, and/or system 300 of FIG. 3.

In some implementations, process 400 may be implemented by one or more servers, such as in connection with providing a service to a network (e.g., a security entity and/or a network endpoint such as a client device). In some implementations, process 400 may be implemented by a security entity (e.g., a firewall) such as in connection with enforcing a security policy with respect to files communicated across a network or in/out of the network. In some implementations, process 400 may be implemented by a client device such as a laptop, a smartphone, a personal computer, etc., such as in connection with executing or opening a file such as an email attachment, or sending network traffic requests (e.g., HTTP requests) across a network.

At 405 the system correlates a plurality of network traffic sessions. The system can correlate a plurality of network traffic sessions having the same source-destination indicators. For example, the system obtains the correlated network traffic based at least in part on determining network traffic sessions having matching source indicators and matching destination indicators.

At 410, the system classifies the plurality of network traffic sessions based at least in part on a plurality of first-layer classifiers to obtain a set of first-layer classifications.

At 415, the system determines a second-layer classification for the correlated network traffic. In some embodiments, the system determines the second-layer classification based at least in part on the set of first-layer classifications.

At 420, a determination is made as to whether process 400 is complete. In some embodiments, process 400 is determined to be complete in response to a determination that no further network traffic sessions are to be handled, no further correlated network traffic sessions are to be classified, no further network traffic sessions can be correlated with another network traffic session, an administrator indicates that process 400 is to be paused or stopped, etc. In response to a determination that process 400 is complete, process 400 ends. In response to a determination that process 400 is not complete, process 400 returns to 405.

Although the example shown describes the correlation of network traffic sessions occurring before the determining the set of first-layer classifications, in various embodiments network traffic sessions are classified to obtain first-layer classifications and then the system correlates the network traffic sessions to obtain the correlated network traffic or set of first-layer classifications.

Figure 5:
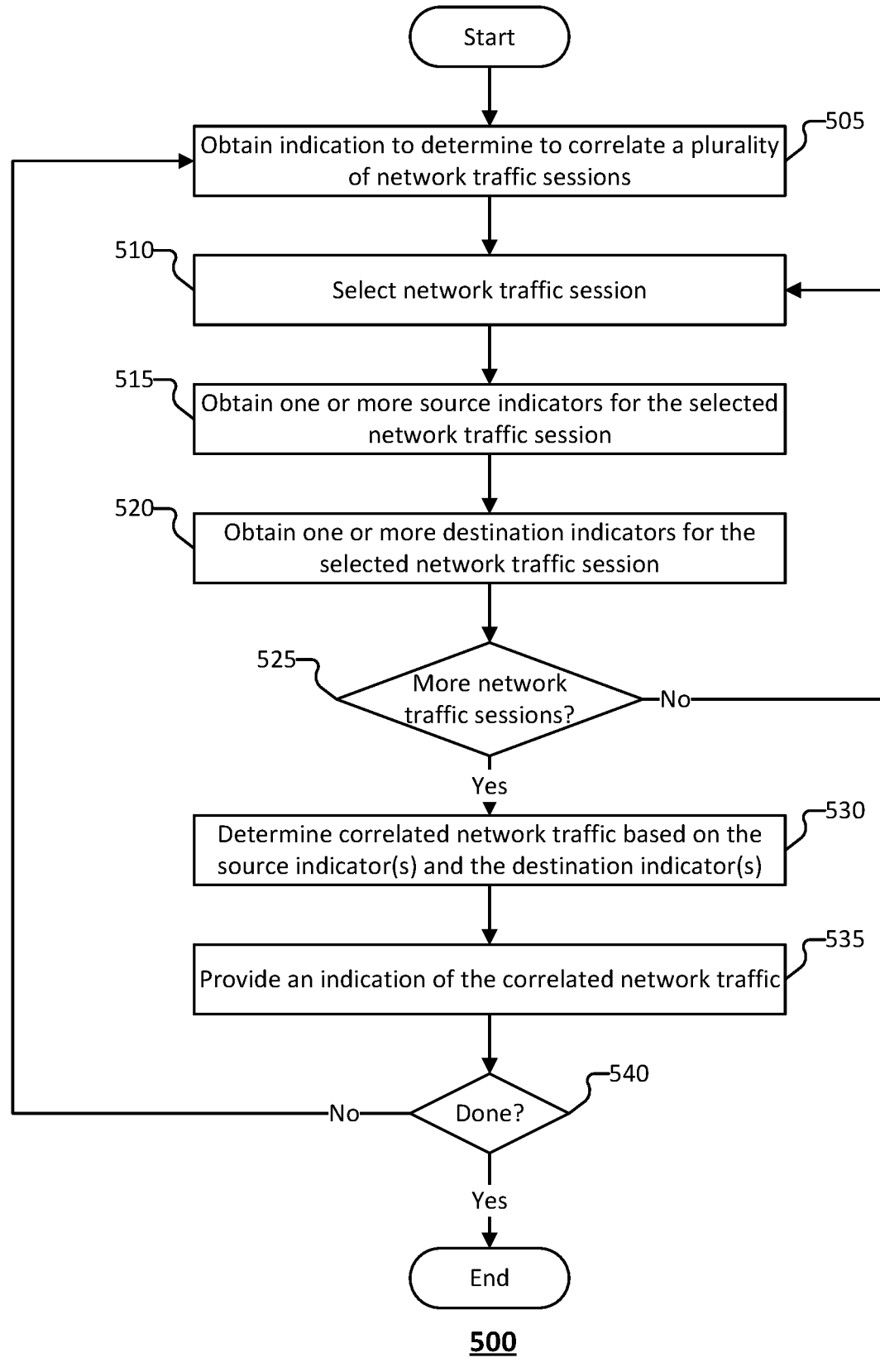
FIG. 5 is a flow diagram of a method for determining correlated network traffic sessions according to various embodiments.

FIG. 5 is a flow diagram of a method for determining correlated network traffic sessions according to various embodiments. In various embodiments, process 500 is implemented at least in part by system 100 of FIG. 1, system 200 of FIG. 2, and/or system 300 of FIG. 3. Process 500 may be invoked by process 400 such as at 405.

In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network. In some implementations, process 500 may be implemented by a client device such as a laptop, a smartphone, a personal computer, etc., such as in connection with executing or opening a file such as an email attachment, or sending network traffic requests (e.g., HTTP requests) across a network.

At 505, the system obtains an indication to determine to correlate a plurality of network traffic sessions.

At 510, the system selects a network traffic session. For example, the system selects the network traffic session from among the plurality of network traffic sessions (e.g., a set of correlated network traffic sessions).

At 515, the system obtains one or more source indicators for the selected network traffic session.

At 520, the system obtains one or more destination indicators for the selected network traffic session.

At 525, the system determines whether source-destination indicators are to be obtained for another network traffic session. For example, system determines whether additional network traffic sessions are to be analyzed.

In response to determining that a source-destination indicator(s) is to be obtained for another network traffic session, process 500 returns to 510 and process 500 iterates over 510-525 until no further source-destination indicator(s) are to be obtained for network traffic sessions. Conversely, in response to determining that no further source-indicators are to be obtained for network traffic sessions, process 500 proceeds to 530.

At 530, the system determines correlated network traffic based at least in part on the source indicator(s) and the destination indicator(s). In some embodiments, the system determines the correlated network traffic based on matching source indicators (e.g., source IP addresses) and/or destination indicators (e.g., destination IP addresses, destination domain names, etc.

At 535, the system provides an indication of the correlated network traffic.

At 520, a determination is made as to whether process 500 is complete. In some embodiments, process 500 is determined to be complete in response to a determination that no further network traffic sessions are to be handled, no further correlated network traffic sessions are to be classified, no further network traffic sessions are to be correlated, an administrator indicates that process 500 is to be paused or stopped, etc. In response to a determination that process 500 is complete, process 500 ends. In response to a determination that process 500 is not complete, process 500 returns to 505.

Figure 6:
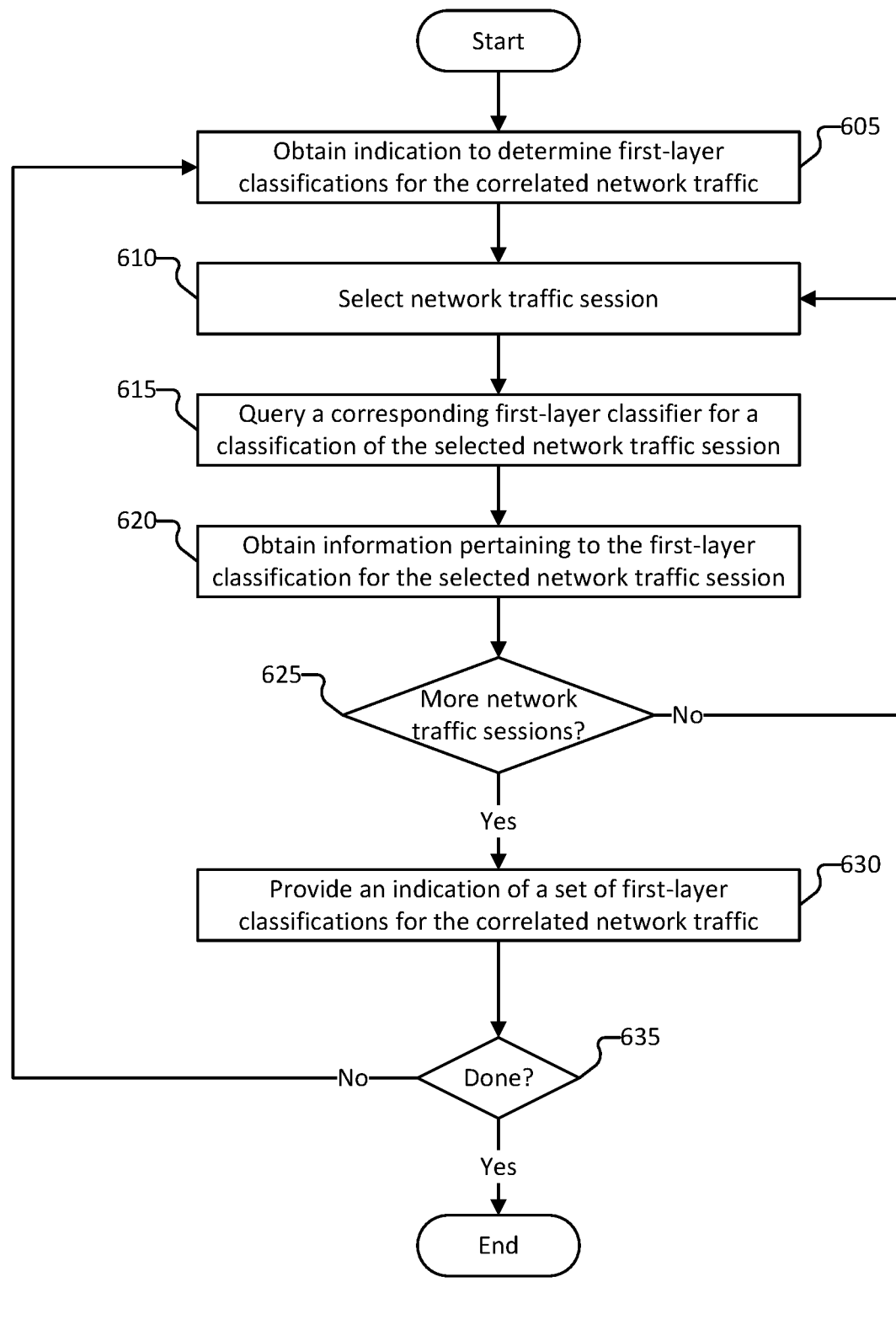
FIG. 6 is a flow diagram of a method for determining first-layer classifications for correlated network traffic according to various embodiments.

FIG. 6 is a flow diagram of a method for determining first-layer classifications for correlated network traffic according to various embodiments. In various embodiments, process 600 is implemented at least in part by system 100 of FIG. 1, system 200 of FIG. 2, and/or system 300 of FIG. 3. Process 600 may be invoked by process 400 such as at 410.

In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network. In some implementations, process 600 may be implemented by a client device such as a laptop, a smartphone, a personal computer, etc., such as in connection with executing or opening a file such as an email attachment, or sending network traffic requests (e.g., HTTP requests) across a network.

At 605, the system obtains an indication to determine first-layer classifications for the correlated network traffic.

At 610, the system selects a network traffic session. For example, the system selects a network traffic session from among the network traffic sessions in the correlated network traffic.

At 615, the system queries a corresponding first-layer classifier for a classification of the selected network traffic session. The first-layer classifier determines a first-layer classification, such as an indication of a probability of that a particular network traffic session (e.g., session data for a particular protocol) is malicious, etc. The first-layer classifier may be a rule-based classifier or an ML-based classifier.

At 620, the system obtains information pertaining to the first-layer classification for the selected network traffic session. For example, the system obtains the first-layer classification (e.g., a verdict of whether the selected network traffic session is malicious), a probability that the selected traffic session is malicious, a set of features used by the first-layer classification in connection with obtaining the first-layer classification, a feature vector, etc.

At 625, the system determines whether another network traffic session is to be classified. For example, the system determines whether the correlated network traffic comprises another network traffic session for which a first-layer classification is to be obtained/determined. In response to determining that another network traffic session(s) is to be classified, process 600 returns to 610 and process 600 iterates over 610-625 until no further network traffic sessions are to be classified. Conversely, in response to determining that no further network traffic sessions are to be classified (e.g., the correlated network traffic does not comprise any further network traffic sessions for which the first-layer classification is to be determined), process 600 proceeds to 630.

At 630, the system provides an indication of a set of first-layer classifications for the selected network traffic session.

At 635, a determination is made as to whether process 600 is complete. In some embodiments, process 600 is determined to be complete in response to a determination that no further network traffic sessions are to be handled, no further correlated network traffic sessions are to be classified, no further network sessions in the correlated network traffic are to be classified (e.g., no further first-layer classifications are to be determined), an administrator indicates that process 600 is to be paused or stopped, etc. In response to a determination that process 600 is complete, process 600 ends. In response to a determination that process 600 is not complete, process 600 returns to 605.

Figure 7:
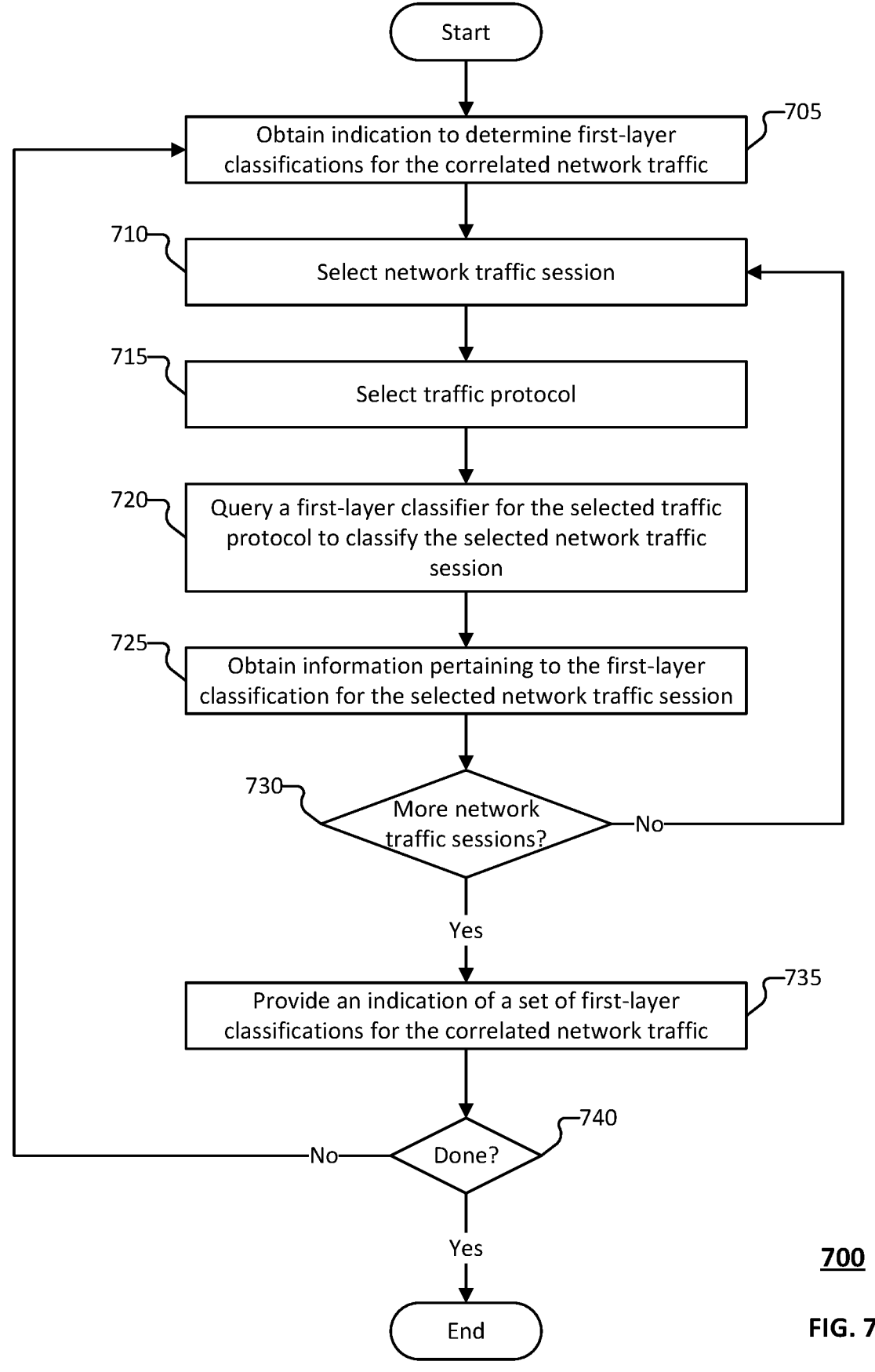
FIG. 7 is a flow diagram of a method for determining first-layer classifications for correlated network traffic according to various embodiments.

FIG. 7 is a flow diagram of a method for determining first-layer classifications for correlated network traffic according to various embodiments. In various embodiments, process 700 is implemented at least in part by system 100 of FIG. 1, system 200 of FIG. 2, and/or system 300 of FIG. 3. Process 700 may be invoked by process 400 such as at 410.

In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment, or sending network traffic requests (e.g., HTTP requests) across a network.

At 705, the system obtains an indication to determine first-layer classifications for the correlated network traffic.

At 710, the system selects a network traffic session. For example, the system selects a network traffic session from among the network traffic sessions in the correlated network traffic.

At 715, the system selects a traffic protocol. For example, the system determines the traffic protocol associated with the selected network traffic session. The system may use a first-layer classifier that is trained to classify network traffic for the selected traffic protocol. Examples of traffic protocols that may be supported include HTTP, SSL/TLS, DNS, UDP, TCP, ICMP, etc. Various other protocols may be supported.

At 720, the system queries a first-layer classifier for the selected traffic protocol to classify the selected network traffic session. For example, the system stores a mapping of traffic protocols to first-layer classifiers. The system can perform a lookup and determine the first-layer classifier associated with (e.g., mapped to) the selected traffic protocol. In response to determining the first-layer classifier to be used to classify the network traffic session, the system queries such first-layer classifier (e.g., for a first-layer classification).

At 725, the system obtains information pertaining to the first-layer classification for the selected network traffic session. For example, the system obtains the first-layer classification (e.g., a verdict of whether the selected network traffic session is malicious), a probability that the selected traffic session is malicious, a set of features used by the first-layer classification in connection with obtaining the first-layer classification, a feature vector, etc.

At 730, the system determines whether another network traffic session is to be classified. For example, the system determines whether the correlated network traffic comprises another network traffic session for which a first-layer classification is to be obtained/determined. In response to determining that another network traffic session(s) is to be classified, process 700 returns to 610 and process 700 iterates over 710-730 until no further network traffic sessions are to be classified. Conversely, in response to determining that no further network traffic sessions are to be classified (e.g., the correlated network traffic does not comprise any further network traffic sessions for which the first-layer classification is to be determined), process 700 proceeds to 735.

At 735, the system provides an indication of a set of first-layer classifications for the selected network traffic session.

At 740, a determination is made as to whether process 700 is complete. In some embodiments, process 700 is determined to be complete in response to a determination that no further network traffic sessions are to be handled, no further correlated network traffic sessions are to be classified, no further network sessions in the correlated network traffic are to be classified (e.g., no further first-layer classifications are to be determined), an administrator indicates that process 700 is to be paused or stopped, etc. In response to a determination that process 700 is complete, process 700 ends. In response to a determination that process 700 is not complete, process 700 returns to 705.

Figure 8:
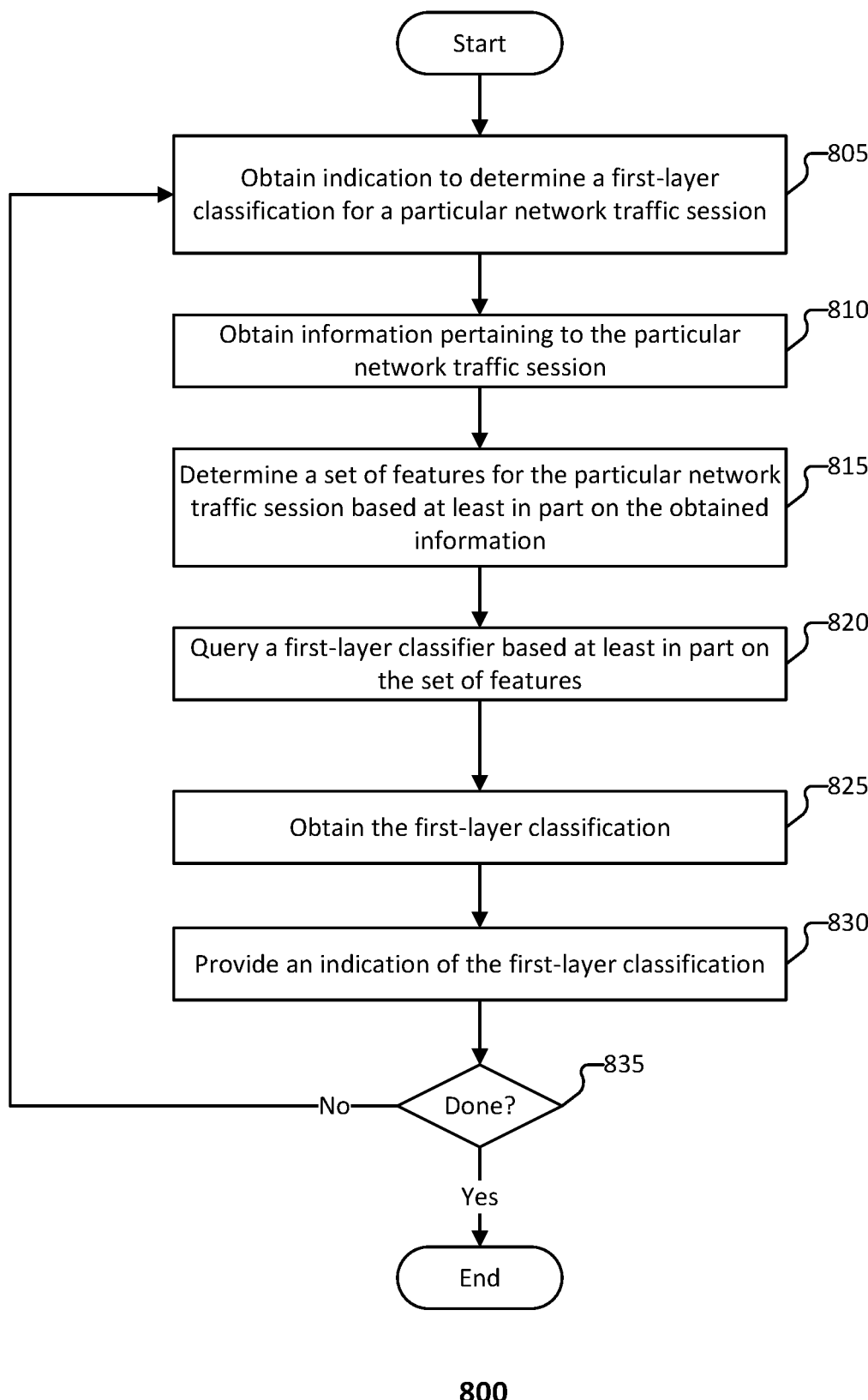
FIG. 8 is a flow diagram of a method for determining a first-layer classification for a particular network traffic session according to various embodiments.

FIG. 8 is a flow diagram of a method for determining a first-layer classification for a particular network traffic session according to various embodiments. In various embodiments, process 800 is implemented at least in part by system 100 of FIG. 1, system 200 of FIG. 2, and/or system 300 of FIG. 3. Process 800 may be invoked by process 400, process 600 (e.g., at 615), and/or process 700 (e.g., at 720).

In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network. In some implementations, process 800 may be implemented by a client device such as a laptop, a smartphone, a personal computer, etc., such as in connection with executing or opening a file such as an email attachment, or sending network traffic requests (e.g., HTTP requests) across a network.

At 805, the system obtains an indication to determine a first-layer classification for a particular network traffic session.

At 810, the system obtains information pertaining to the particular network traffic session.

At 815, the system determines a set of features for the particular network traffic session based at least in part on the obtained information.

At 820, the system queries a first-layer classifier based at least in part on the set of features.

At 825, the system obtains the first-layer classification. For example, the system obtains the classification or verdict from the first-layer classifier. The classification/verdict may be an indication of whether the network traffic session is malicious, or an indication of a probability/likelihood that the network traffic session is malicious.

At 830, the system provides an indication of the first-layer classification. In some embodiments, the indication of the first-layer classification is provided to a second-layer classifier, or a service/process that performs the second-layer classification.

In various embodiments, before providing the indication of the first-layer classification second-layer classifier, or a service/process that performs the second-layer classification, the system provides the indication of the first-layer classification to a process, service, or other system that correlates network traffic sessions to obtain correlated network traffic to be classified by the second-layer classifier.

At 835, a determination is made as to whether process 800 is complete. In some embodiments, process 800 is determined to be complete in response to a determination that no further network traffic sessions are to be handled, no further correlated network traffic sessions are to be classified, no further network sessions in the correlated network traffic are to be classified (e.g., no further first-layer classifications are to be determined), an administrator indicates that process 800 is to be paused or stopped, etc. In response to a determination that process 800 is complete, process 800 ends. In response to a determination that process 800 is not complete, process 800 returns to 805.

FIG. 9 is a flow diagram of a method for determining a classification for correlated network traffic sessions according to various embodiments. In various embodiments, process 900 is implemented at least in part by system 100 of FIG. 1, system 200 of FIG. 2, and/or system 300 of FIG. 3. Process 900 may be invoked by process 400 such as at 415.

In some implementations, process 900 may be implemented by one or more servers, such as in connection with providing a service to a network (e.g., a security entity and/or a network endpoint such as a client device). In some implementations, process 900 may be implemented by a security entity (e.g., a firewall) such as in connection with enforcing a security policy with respect to files communicated across a network or in/out of the network. In some implementations, process 900 may be implemented by a client device such as a laptop, a smartphone, a personal computer, etc., such as in connection with executing or opening a file such as an email attachment, or sending network traffic requests (e.g., HTTP requests) across a network.

At 905, the system obtains an indication to determine a second-layer classification for a particular correlated set of network traffic sessions.

At 910, the system obtains a set of first-layer classifications for the correlated set of network traffic sessions. The various first-layer classifications in the set of first-layer classifications may correspond to classifications for a plurality of traffic protocols. For example, a first first-layer classification corresponds to a first traffic protocol (e.g., HTTP) and a second first-layer classification corresponds to a second traffic protocol (e.g., SSL). In some embodiments, the set of first-layer classifications comprises a classification for each traffic protocol associated with a network traffic session in the correlated network traffic.

At 915, the system queries a second-layer classifier to classify the correlated set of network traffic sessions. In some embodiments, the system queries the second-layer classifier based at least in part on the set of first-layer classifications. The system may additionally query the second-layer classifier based on features obtained at the first-layer classifiers or other metadata obtained from the network traffic sessions. The second-layer classifier may be a rule-based classifier or machine learning based classifier.

At 920, the system obtains the second-layer classification. For example, the system obtains a verdict from the second-layer classifier. The verdict may be an indication of whether the correlated network traffic corresponds to malicious traffic or a malicious exploit. Additionally, or alternatively, the verdict may indicate a probability or likelihood that the correlated network traffic is malicious.

At 925, the system provides an indication of the second-layer classification for the correlated network traffic. In some embodiments, the system provides the indication to another system, service, or process that invoked process 900. Additionally, or alternatively, the system may provide an indication to another system to invoke an active measure in response to determining that the second-layer classification indicates that the correlated network traffic is malicious. The system may provide the indication to a system or service that handles network traffic according to one or more security policies, or that determines how (e.g., based on one or more security policies) to handle network traffic.

At 930, a determination is made as to whether process 900 is complete. In some embodiments, process 900 is determined to be complete in response to a determination that no further network traffic sessions are to be handled, no further correlated network traffic sessions are to be classified (e.g., no further second-layer classifications are to be determined), an administrator indicates that process 900 is to be paused or stopped, etc. In response to a determination that process 900 is complete, process 900 ends. In response to a determination that process 900 is not complete, process 900 returns to 905.

Figure 10:
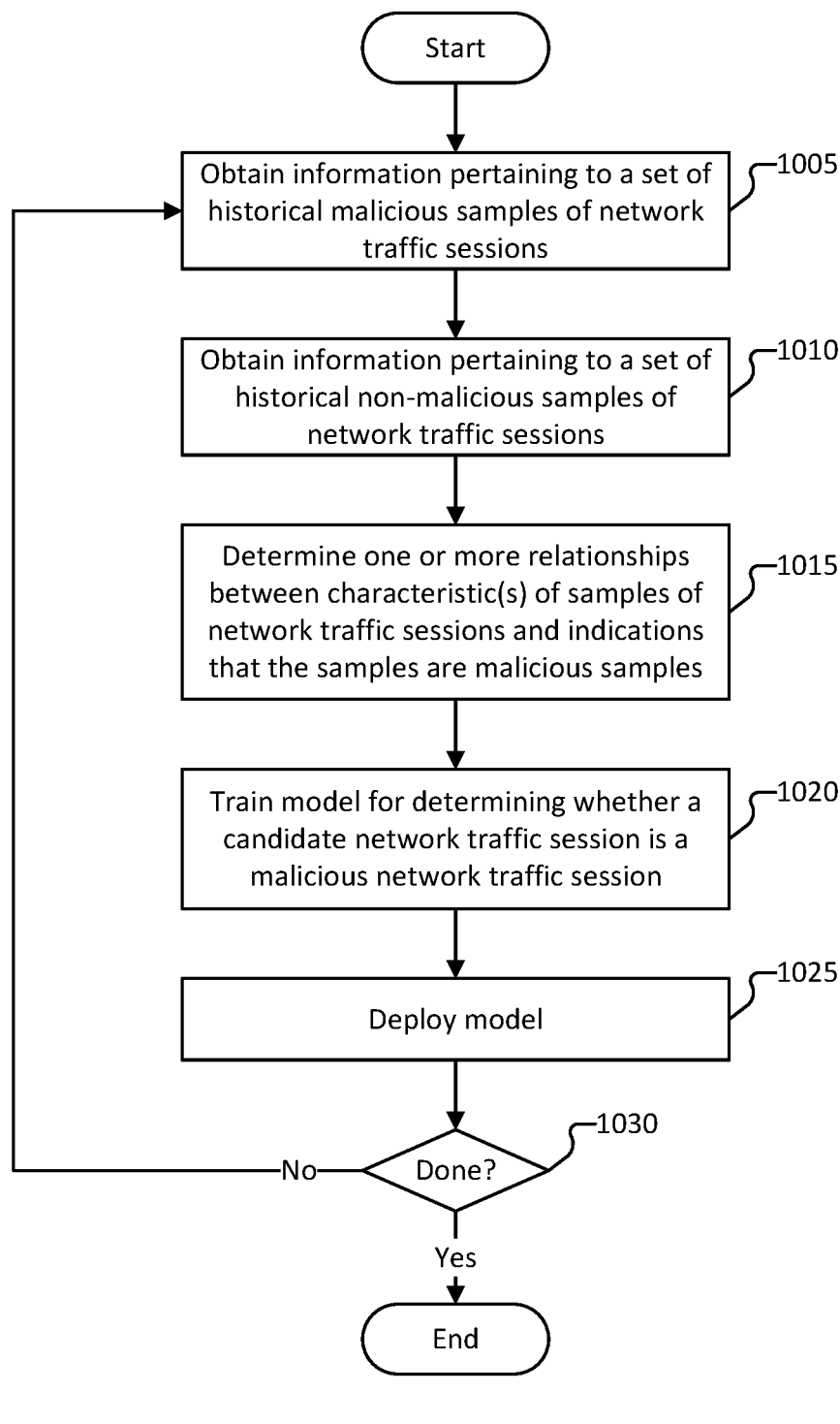
FIG. 10 is a flow diagram of a method for training a classifier according to various embodiments.

FIG. 10 is a flow diagram of a method for training a classifier according to various embodiments. In various embodiments, process 1000 is implemented at least in part by system 100 of FIG. 1, system 200 of FIG. 2, and/or system 300 of FIG. 3.

At 1005, information pertaining to a set of historical malicious samples is obtained. For example, the set of historical malicious samples include samples of malicious network traffic sessions. In some embodiments, the system obtains the information pertaining to a set of historical malicious samples from a third-party service (e.g., VirusTotal™). The system collects sample network traffic, including malicious traffic such as C2 traffic. At 1010, information pertaining to a set of historical benign samples is obtained. For example, the set of historical malicious samples include samples of non-malicious or benign network traffic sessions. In some embodiments, the system obtains the information pertaining to a set of historical benign samples from a third-party service (e.g., VirusTotal™). The system collects benign traffic, such as based on samples for which malicious traffic detection was previously performed (e.g., using one or more machine learning models, etc.). At 1015, the system determines one or more relationships between characteristic (s) of samples of network traffic sessions and indications that the samples are malicious samples. At 1020, a model is trained for determining whether a sample is malicious (e.g., whether a traffic sample is C2 traffic). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. At 1025, the model is deployed. In some embodiments, the deploying of the model includes storing the model in a dataset of models for use in connection with analyzing traffic to determine whether the traffic is malicious. The deploying the model can include providing the model (or a location at which the model can be invoked) to a malicious traffic detector, such as network traffic classifier 170 of system 100 of FIG. 1, or to system 200 of FIG. 2. At 1030, a determination is made as to whether process 1000 is complete. In some embodiments, process 1000 is determined to be complete in response to a determination that no further models are to be determined/trained (e.g., no further classification models are to be created), an administrator indicates that process 1000 is to be paused or stopped, etc. In response to a determination that process 1000 is complete, process 1000 ends. In response to a determination that process 1000 is not complete, process 1000 returns to 1005.

Figure 11:
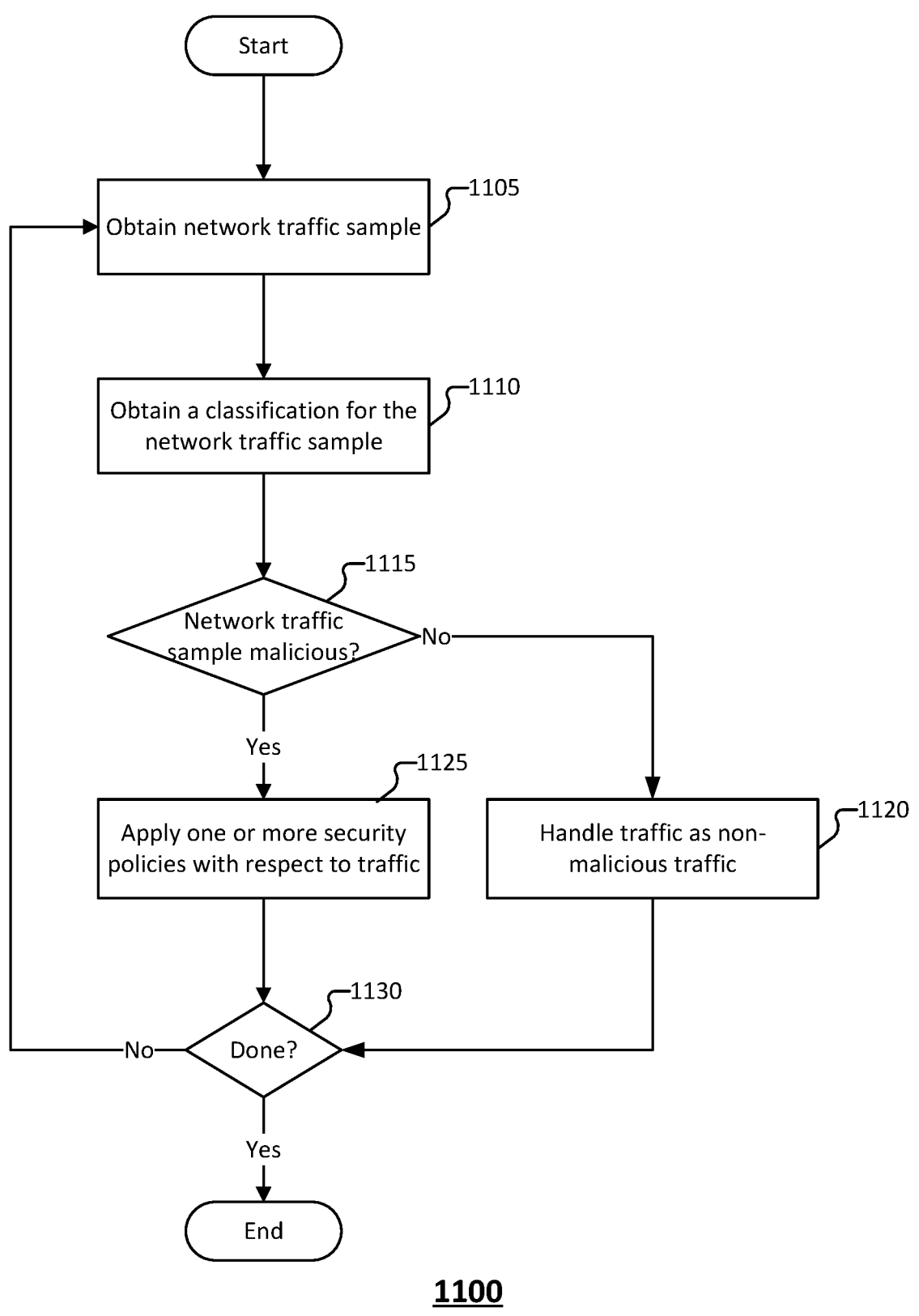
FIG. 11 is a flow diagram of a method for handling traffic based on a traffic classification according to various embodiments.

FIG. 11 is a flow diagram of a method for handling traffic based on a traffic classification according to various embodiments. In various embodiments, process 1100 is implemented at least in part by system 100 of FIG. 1, system 200 of FIG. 2, and/or system 300 of FIG. 3. In some implementations, process 1100 may be implemented by one or more servers, such as in connection with providing a service to a network (e.g., a security entity and/or a network endpoint such as a client device). In some implementations, process 1100 may be implemented by a security entity (e.g., a firewall) such as in connection with enforcing a security policy with respect to files communicated across a network or in/out of the network. In some implementations, process 1100 may be implemented by a client device such as a laptop, a smartphone, a personal computer, etc., such as in connection with executing or opening a file such as an email attachment, or sending network traffic requests (e.g., HTTP requests) across a network.

In some embodiments, the system comprises a cloud service that provides near real-time traffic detection (e.g., a detection latency from the cloud service may be on the order of 10-50 ms).

At 1105, the system obtains a network traffic sample(s). The system may obtain network traffic sample(s) such as in connection with routing traffic within/across a network, or mediating traffic into/out of a network such as a firewall, or a monitoring of email traffic or instant message traffic.

At 1110, the system obtains a classification for the network traffic sample. For example, the system determines whether the network traffic sample is malicious. As an example, the system detects whether the traffic is C2 traffic.

In some embodiments, process 1100 invokes process 400 of FIG. 4 in connection with obtaining the classification.

In some embodiments, the system implements a multi-modal classification of the network traffic sample. For example, the system performs a multi-layer classification of the network traffic sample. The system can obtain network traffic samples that are correlated but that implement different protocols, and for each traffic protocol, the system performs a first-layer classification (e.g., a protocol-specific classification), and then uses verdicts from the first-layer classifications in connection with classifying the correlated network traffic (e.g., performing a second-layer classification based at least in part on the verdicts from the first-layer classifications). The system may correlate a set of network traffic samples based on performing a matching of network traffic samples based at least in part on a source indicator(s) and destination indicator(s).

According to various embodiments the system obtains a classification for the network traffic sample based at least in part on performing a look up against a blacklist (e.g., a mapping of malicious samples to signatures) and/or whitelist (e.g., a mapping of non-malicious or benign samples to signatures). The system can determine whether the network traffic sample (e.g., the correlated network traffic) has been previously analyzed/classified. For example, in response to performing a classification, the system computes a signature (e.g., perform a hash based on a predefined hashing function) and stores the signature in association with the classification.

In some embodiments, the system uses mappings of network traffic sample classifications to signatures to perform the first-layer classifications (e.g., the traffic protocol-specific classifications). The system may store mappings of signatures to classifications for a plurality of traffic protocols, and the system can query the mappings/index to determine whether the particular network traffic sample (e.g., a network traffic sample comprised in correlated network traffic) has been previously classified.

In some embodiments, the system uses mappings of network traffic sample classifications to signatures to perform the second-layer classifications (e.g., the classification across a plurality of traffic protocols).

In connection with performing the first-layer classification and/or the second-layer classification, the system can first query a mapping/index to determine whether the sample has been previously analyzed/classified. In response to determining that the sample has been previously analyzed/classified, the system uses such previous classification. Conversely, in response to determining that the sample has not been previously analyzed/classified (e.g., determining that the mapping/index does not comprise an entry matching the sample), the system can query a classifier to perform a classification (e.g., a contemporaneous or real-time classification using the first-layer classifier or second-layer classifier, as applicable).

In some embodiments, the system determines whether the traffic sample corresponds to a sample comprised in a set of previously identified benign samples such as a whitelist of benign samples. In response to determining that the sample is comprised in the set of samples on the whitelist of benign samples, the system determines that the sample is not malicious.

According to various embodiments, in response to determining the traffic sample is not comprised in a set of previously identified malicious samples (e.g., a blacklist of malicious samples) or a set of previously identified benign samples (e.g., a whitelist of benign files), the system deems the traffic sample as being non-malicious (e.g., benign) for the first-layer classification or the second-layer classification, as applicable.

According to various embodiments, in response to determining the traffic sample is not comprised in a set of previously identified malicious samples (e.g., a blacklist of malicious samples) or a set of previously identified benign samples (e.g., a whitelist of benign samples), the system queries a malicious traffic detector to determine whether the traffic is malicious (e.g., to perform automatic C2 traffic detection). For example, the system may quarantine the traffic until the system receives response form the malicious traffic detector as to whether the traffic sample is malicious. The malicious traffic detector may perform an assessment of whether the traffic sample is malicious contemporaneous with the handling of the traffic by the system (e.g., in real-time with the query from the system). The malicious traffic detector may correspond to network traffic classifier 170 of system 100 of FIG. 1 and/or system 200 of FIG. 2.

In response to receiving the indication that the sample is malicious (e.g., with respect to a first-layer classification in the case of a protocol-specific sample or with respect to a second-layer classification in the case of a correlated network traffic sample), the system stores the indication that the sample is malicious in association with the sample or an identifier corresponding to the sample to facilitate a lookup (e.g., a local lookup) of whether subsequently received traffic is malicious. In some embodiments, the identifier corresponding to the sample stored in association with the indication that the sample is malicious comprises a hash of a header (or part of the header or normalized header), a signature of a header (or part of the header or normalized header), a source from which the traffic originated (e.g., a domain name or IP address of a device from which the traffic originated), or another unique identifier associated with the network traffic.

At 1115, the system determines whether the network traffic sample is malicious. For example, the system determines whether the classification indicates that the sample is malicious. As another example, the system determines whether the classification (e.g., the verdict from the second-layer classifier) comprises a probability or likelihood that the sample is malicious that exceeds a predefined maliciousness threshold.

In response to a determination that the traffic is not malicious traffic at 1115, process 1100 proceeds to 1120 at which the traffic is handled as non-malicious traffic/information.

In response to a determination that the traffic sample is malicious at 1115, process 1100 proceeds to 1125 at which the traffic is handled as malicious traffic/information. The system may handle the malicious traffic/information based at least in part on one or more policies such as one or more security policies.

According to various embodiments, the handling of the malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious traffic, etc. Examples of active measures that may be performed include: isolating the traffic (e.g., quarantining the traffic), deleting the traffic, prompting the user to alert the user that a malicious traffic was detected, blocking transmission of the traffic, updating a blacklist of malicious samples (e.g., a mapping of a hash for the traffic sample to an indication that the traffic sample is malicious, etc.).

At 1130, a determination is made as to whether process 1100 is complete. In some embodiments, process 1100 is determined to be complete in response to a determination that no further samples are to be analyzed (e.g., no further predictions for traffic are needed), no further correlated traffic is to be classified, no further network traffic is received, an administrator indicates that process 1100 is to be paused or stopped, etc. In response to a determination that process 1100 is complete, process 1100 ends. In response to a determination that process 1100 is not complete, process 1100 returns to 1105.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing a multi-modal automated detection of malicious command and control traffic, comprising:

one or more processors configured to:

correlate a plurality of network traffic sessions across a plurality of different network protocols to obtain correlated network traffic wherein the correlation is based at least in part on matching a source IP address and a destination indicator, the destination indicator comprising a destination IP address or a domain name obtained protocol-specifically from one or more of a host name in an HTTP packet, a domain name in a DNS record, or a server name indicator (SNI) in SSL/TLS;

classify the plurality of network traffic sessions based at least in part on a plurality of first-layer classifiers to obtain a set of first-layer classifications, wherein each of the plurality of first-layer classifiers are respectively associated with a different one of the plurality of different network protocols and configured to generate a first-layer classification comprising an indication of maliciousness for a corresponding session; and determine a second-layer classification for the correlated network traffic based at least in part on the set of first-layer classifications, wherein the second-layer classification comprises an aggregated indication of whether the correlated network traffic is malicious; and a memory coupled to the one or more processors and configured to provide the one or more processors with instructions.

2. The system of claim 1, wherein the plurality of network sessions uses two or more network protocols.

3. The system of claim 1, wherein correlated network traffic is determined based at least in part on a determination a match between: (i) a source IP address associated with two more network traffic sessions, and (ii) one or more of a destination IP and a domain name associated with the two or more network traffic sessions.

4. The system of claim 1, wherein the plurality of first-layer classifiers comprises a machine learning-based classifier.

5. The system of claim 1, wherein the plurality of first-layer classifiers comprises a rule-based classifier.

6. The system of claim 1, wherein the one or more processors are further configured to:

perform feature extraction to obtain a set of first-layer features with respect to the plurality of network traffic sessions.

7. The system of claim 6, wherein the second-layer classification is further based on one or more of the set of first-layer features.

8. The system of claim 1, wherein the one or more processors are further configured to:

provide the second-layer classification.

9. The system of claim 1, wherein the second-layer classification is provided to a user via a user interface.

10. The system of claim 1, wherein the one or more processors are further configured to:

perform an active measure with respect to the correlated network traffic in response to determining that the second-layer classification indicates that the correlated network traffic is malicious.

11. The system of claim 1, wherein the one or more processors are further configured to:

handle the correlated network traffic based at least in part on the second-layer classification and one or more security policies.

12. The system of claim 1, wherein the plurality of network traffic sessions are correlated based at least in part on (i) a determination that the plurality of network traffic sessions for a plurality of protocols have a same source IP address for all of the plurality of protocols, and (ii) a determination that the plurality of network traffic sessions for the plurality of protocols have: (a) a same destination IP address, or (b) a same domain name.

13. The system of claim 12, wherein a domain name for a particular network traffic session is obtained based at least in part on a host name in an HTTP packet.

14. The system of claim 12, wherein the domain name for a network for a particular network traffic session corresponds to a domain name in a DNS record.

15. The system of claim 12, wherein the domain name for a network for a particular network traffic session corresponds to a server name indicator (SNI) in secure sockets layer (SSL).

16. The system of claim 1, wherein the plurality of first-layer classifiers applies a machine-learning based classifier for each network protocol associated with the plurality of network traffic sessions.

17. The system of claim 1, wherein a first-layer classification comprises a probability that a corresponding network traffic session is malicious.

18. The system of claim 17, wherein a first-layer classification further comprises a plurality of features or protocol-specific metadata.

19. The system of claim 1, wherein a first-layer classifier comprised in the plurality of first-layer classifiers is trained based at least in part on benign samples for a particular protocol traffic, and malicious samples for the particular protocol traffic.

20. The system of claim 1, wherein a second-layer classifier determines the second-layer classification based at least in part on a rule-based model and/or a machine learning-based model.

21. A method for performing a multi-modal automated detection of malicious command and control traffic, comprising:

correlating a plurality of network traffic sessions across a plurality of different network protocols to obtain correlated network traffic wherein the correlation is based at least in part on matching a source IP address and a destination indicator, the destination indicator comprising a destination IP address or a domain name obtained protocol-specifically from one or more of a host name in an HTTP packet, a domain name in a DNS record, or a server name indicator (SNI) in SSL/TLS;

classifying the plurality of network traffic sessions based at least in part on a plurality of first-layer classifiers to obtain a set of first-layer classifications, wherein each of the plurality of first-layer classifiers are respectively associated with a different one of the plurality of different network protocols and configured to generate a first-layer classification comprising an indication of maliciousness for a corresponding session; and determining a second-layer classification for the correlated network traffic based at least in part on the set of first-layer classifications, wherein the second-layer classification comprises an aggregated indication of whether the correlated network traffic is malicious.

22. A computer program product embodied in a non-transitory computer readable medium for performing a multi-modal automated detection of malicious command and control traffic, and the computer program product comprising computer instructions for:

correlating a plurality of network traffic sessions across a plurality of different network protocols to obtain correlated network traffic wherein the correlation is based at least in part on matching a source IP address and a destination indicator, the destination indicator comprising a destination IP address or a domain name obtained protocol-specifically from one or more of a host name in an HTTP packet, a domain name in a DNS record, or a server name indicator (SNI) in SSL/TLS;

classifying the plurality of network traffic sessions based at least in part on a plurality of first-layer classifiers to obtain a set of first-layer classifications, wherein each of the plurality of first-layer classifiers are respectively associated with a different one of the plurality of different network protocols and configured to generate a first-layer classification comprising an indication of maliciousness for a corresponding session; and determining a second-layer classification for the correlated network traffic based at least in part on the set of first-layer classifications, wherein the second-layer classification comprises an aggregated indication of whether the correlated network traffic is malicious.

23. The system of claim 1, wherein a first-layer classifier comprised in the plurality of first-layer classifiers is trained based at least in part on a set of benign samples for a particular network protocol and a set of malicious samples for the particular network protocol.

24. The system of claim 1, wherein the one or more processors are further configured to:

perform feature extraction to obtain a set of first-layer features with respect to the plurality of network traffic sessions, wherein:

the set of first-layer features comprises protocol-specific metadata; and the second-layer classification is further based at least in part on one or more of the set of first-layer features.

25. The system of claim 1, wherein the one or more processors are further configured to:

handle the correlated network traffic based at least in part on the second-layer classification and one or more security policies, wherein handling the correlated network traffic comprises performing an active measure with respect to the correlated network traffic in response to determining that the second-layer classification indicates that the correlated network traffic is malicious.

* * * * *